United States Patent
Nel et al.

(10) Patent No.: US 11,545,046 B2
(45) Date of Patent: Jan. 3, 2023

(54) NEUROADAPTIVE INTELLIGENT VIRTUAL REALITY LEARNING SYSTEM AND METHOD

(71) Applicant: Singularity Education Group, Moffett Field, CA (US)

(72) Inventors: Kyle Nel, Austin, TX (US); Amanda Manna, Charlotte, NC (US); Michael Snyder, Jacksonville, FL (US)

(73) Assignee: Talespin Reality Labs. Inc., Culver City, CA (US)

( * ) Notice: Subject to any disclaimer, the term of this patent is extended or adjusted under 35 U.S.C. 154(b) by 617 days.

(21) Appl. No.: 16/569,542

(22) Filed: Sep. 12, 2019

(65) Prior Publication Data

US 2020/0082735 A1 Mar. 12, 2020

Related U.S. Application Data

(60) Provisional application No. 62/743,351, filed on Oct. 9, 2018, provisional application No. 62/742,910, filed on
(Continued)

(51) Int. Cl.
*G06N 5/04* (2006.01)
*G06N 20/00* (2019.01)
(Continued)

(52) U.S. Cl.
CPC .............. *G09B 19/00* (2013.01); *G06F 3/011* (2013.01); *G06F 3/013* (2013.01); *G06F 3/015* (2013.01);
(Continued)

(58) Field of Classification Search
CPC .......... G09B 19/00; G09B 7/02; G09B 5/065; G09B 5/125; G09B 7/04; G06F 3/013;
(Continued)

(56) References Cited

U.S. PATENT DOCUMENTS 9,224,309 B2 * 12/2015 Mutlu .................... A61B 5/375
10,068,490 B2 * 9/2018 Hibbs .................... A61B 5/318
(Continued)

FOREIGN PATENT DOCUMENTS

CA 3007215 A1 6/2017
CN 107329571 B 8/2018

OTHER PUBLICATIONS

International Search Report & Written Opinion for PCT/US2019/050889, dated Jan. 13, 2020, 28 pgs.
(Continued)

*Primary Examiner* — Mihir K Rayan
(74) *Attorney, Agent, or Firm* — David P. Owen; Hoyng Rokh Monegier B.V.

(57) ABSTRACT

A computer-implemented method of providing virtual reality (VR) or Augmented Reality (AR) training includes adapting the VR/AR training based on feedback on the user's biometric data, which may include electroencephalogram (EEG) data and other biometric data. Associations are determined between the biometric data and psychological/neurological factors related to learning, such as a cognitive load, attention, anxiety, and motivation. In one implementation, predictive analytics are used to adapt the VR/AR training to maintain the user with an optimal learning zone during the training.

31 Claims, 34 Drawing Sheets

Related U.S. Application Data on Oct. 8, 2018, provisional application No. 62/730,436, filed on Sep. 12, 2018.

(51) Int. Cl.
| | |
|---|---|
| *G06N 3/08* | (2006.01) |
| *G09B 7/04* | (2006.01) |
| *G09B 19/00* | (2006.01) |
| *G06F 3/01* | (2006.01) |
| *G09B 7/02* | (2006.01) |

(52) U.S. Cl.
CPC ............... *G06N 3/08* (2013.01); *G06N 5/04* (2013.01); *G06N 20/00* (2019.01); *G06F 2203/011* (2013.01); *G09B 7/02* (2013.01); *G09B 7/04* (2013.01)

(58) Field of Classification Search
CPC .... G06F 3/015; G06F 2203/011; G06F 1/163; G06F 3/011; G06F 3/012; G06F 3/0304; G06N 5/04; G06N 20/00; G06N 3/08
See application file for complete search history.

(56) References Cited

U.S. PATENT DOCUMENTS

| | | | |
|---|---|---|---|
| 2012/0130266 A1* | 5/2012 | Mathan | A61B 5/4833 600/544 |
| 2016/0077547 A1* | 3/2016 | Aimone | G16H 40/67 345/8 |
| 2016/0196765 A1* | 7/2016 | Stauch | G09B 19/00 434/236 |
| 2017/0162072 A1 | 6/2017 | Horseman et al. | |
| 2018/0008141 A1 | 1/2018 | Krueger | |
| 2020/0151994 A1* | 5/2020 | Froy | G07F 17/3209 |

OTHER PUBLICATIONS

International Preliminary Report on Patentability for PCT/US2019/050889, dated Mar. 25, 2021, 9 pgs.
Extended European Search Report for EP application No. 19859499.6, issued by the European Patent Office, dated Mar. 18, 2022, 8 pgs.

* cited by examiner

NEUROADAPTIVE INTELLIGENT VIRTUAL REALITY LEARNING SYSTEM AND METHOD

CROSS REFERENCE TO RELATED APPLICATIONS

The present application claims priority under 35 USC § 119(e) to U.S. Provisional Patent Application No. 62/730,436, entitled "Adaptive Intelligent Learning System and Method Utilizing Biofeedback" and filed Sep. 12, 2018, U.S. Provisional Patent Application No. 62/742,910, entitled "Network Connecting People and Headset-Based Brain-Computer Interface" and filed Oct. 8, 2018, and U.S. Provisional Patent Application No. 62/743,351, entitled "Predictive Model-Based System for Lower On-Device Compute Power" and filed Oct. 9, 2018, each of which are incorporated herein by reference in their entirety.

FIELD OF THE INVENTION

The present disclosure generally relates to providing neuro-adaptive ("neuroadaptive") training using virtual reality or augmented reality.

BACKGROUND

The training of employees is a concern in many industries. Virtual reality training is being explored by a variety of companies. Virtual reality offers the potential advances of providing a way to train employees using an immersive environment. However, virtual reality training is still not as effective for enterprise training applications as desired.

SUMMARY

The present disclosure relates to systems and methods for using biometric data as feedback to adapt a training session conducted by virtual reality or augmented reality. One aspect is that predictive techniques may be used to adapt an education training session to maintain the user in an optimal zone for learning. In some embodiments, this includes varying the complexity of the training, the pacing, or the sequence of learning. In one embodiment, the decisions for adapting the educational training may be based on a set of cognitive mental state metrics derived from two or more different types of biometric data. Using different types of biometric data permits a more detailed understanding of how the user is responding to a training session.

It should be understood, however, that this list of features and advantages is not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

DETAILED DESCRIPTION

Figure 1:
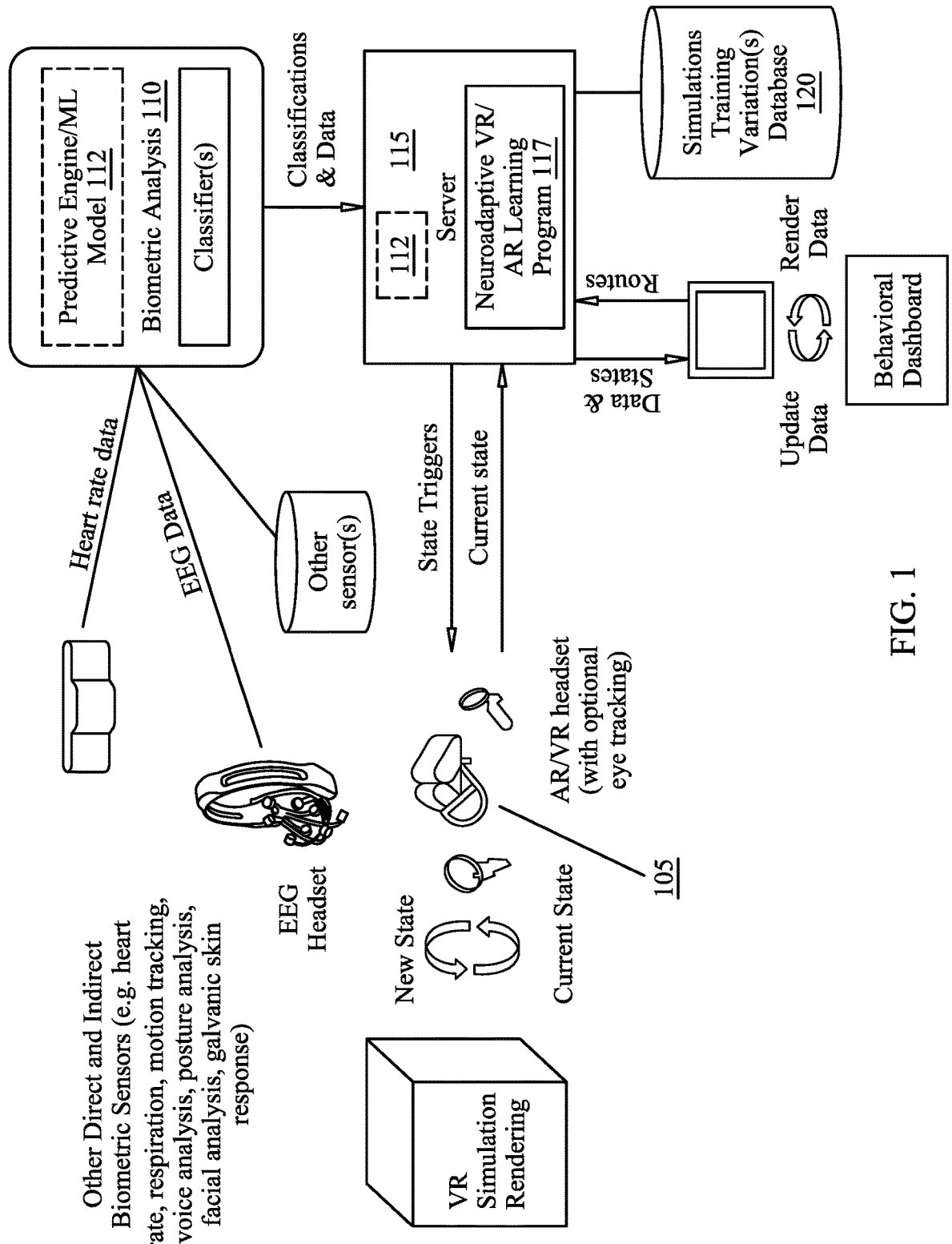
FIG. 1 is a block diagram of a system for proving neuroadaptive educational training in accordance with an embodiment.

FIG. 1 is a diagram illustrating an example of a system to provide neuroadaptive virtual reality (VR) or augmented reality (AR) training. As an illustrative but non-limiting example, the training may include educational content, such as work-related or career-related educational training, as one example of educational content. An end user who is receiving training may, for example, be wearing a VR or AR head display 105, such as a VR headset or an AR headset. In the following discussion, it will be understood that both AR and VR implementations are contemplated.

A set of biometric data is collected from the user to determine cognitive state metrics for the user related to learning efficacy. An individual's ability to learn effectively can be influenced by both external factors and internal factors that have the potential to facilitate or inhibit the learning process. External factors include the environment of the individual in the process of learning that could be distracting or calming to the individual. Some examples of internal factors include the mood of the individual, state of mind, energy level, or health of the individual. An individual's ability to learn also varies over time, and for some individuals the ability to learn can be dependent on the time of day. For example, some individuals might be more effective learners early in the morning and less effective at later times in a day. Conversely, others might be more effective at later times of a day and less effective earlier in a day.

In one embodiment, the biometric data includes a measurement of the user's brainwaves using an electroencephalogram (EEG) headset. Other examples of biometric data include eye tracking data, heart rate measurements, respiration, motion tracking, voice analysis, posture analysis, facial analysis, and galvanic skin response. As illustrated in FIG. 1, the environment about the user may include one or more sensors to collect biometric data, such as one or more camera, microphones, heart monitors, etc. Some of the sensors may, for example, be built into the AR/VR headset, as eye-tracking sensors, microphones, etc. Other biometric sensors may be worn on a user. Still other sensor may be disposed in the general environment about the user, such as additional cameras or microphones. Individual sensors may, for example, transmit sensor data via a wired channel, wireless channel, network interface, etc.

It should be noted that the raw biometric data typically doesn't directly provide feedback on learning efficacy. Further processing of each source of biometric data is desirable to convert the biometric data into a signal having attributes that are correlated or associated with a learning metric. As one example, the raw biometric data is ideally analyzed with respect to baseline data for the user. In the case of raw EEG data, the raw EEG data has different frequency bands (e.g., alpha, beta, and theta wave bands) and also spatial components in the sense that a pattern of sensors over a user's head will have different signal components from each sensor. This spatial pattern may, for example, be symmetric or asymmetric. Certain frequency bands may be generated more in certain parts of the brain than others. The spectral densities for each channel may be determined and noise reduction techniques used. Ratios of the different bands may be determined, along with ratios or other aspects of the spatial dependencies. This can be used to determine a metric related to learning, such as a cognitive load indicative of how hard a user in thinking in a learning session. That is, the raw biometric data is processed to generate a metric correlated to learning efficacy. Further processing permits the signals to be transformed into a cognitive mental state metric for a particular attribute. For example, the metric could be a normalized number, such as a number within a selected range, such as a number between 0 and 1. The set of cognitive mental state metrics can thus be used to determine how to adapt a VR/AR training session.

As an example, raw EEG data may be processed to generate a metric corresponding to a cognitive load, indicative of how "hard" the user is thinking based on the EEG data. However, a completer and more accurate picture of the overall cognitive mental state of the user is generated by including two or more different cognitive mental state metrics. One or more of these many be generated from other sources of non-EEG biometric data. For example, heart rate, respiration, voice analysis, and galvanic skin response may be useful to generate cognitive mental state metrics associated with anxiety.

Some or all of the processing of the biometric data may be performed in a biometric analyzer 110. In one embodiment, the biometric analyzer 110 has a processor, a memory, and computer software program code, stored on the memory and executed by the processor, to implement classifiers to classify the biometric data into the cognitive mental state metrics. This may be done separately for each source of biometric data. However, more generally, metrics may be generated from combinations of biometric data inputs, such as using pre-programmed tables, matrices, or other techniques to convert a combination of inputs from different data sources into at least one output indicative of a learning efficacy. A communication interface may be included in the biometric analyzer 110 to receive biometric data from one or more biometric sensors. For example, a network communication interface may be provided to receive biometric data from individual biometric sensors.

In some embodiments, a trained machine learning model may be used to perform the classification. Examples of a trained learning model are described below in greater detail.

In one embodiment, a server 115 serves the content for the AR/VR training session. The server 115 may include computer processors, a memory, internal communication buses, and external communication interfaces. In some embodiments, the server 115 executes a neuroadaptive VR learning program in which variations of an educational training session (or set of sessions) are supported for a VR or AR educational training session. The variations may, for example, including varying the educational content type, content style, content complexity, pacing, or other factors of the AR/VR training. As one example a database 120 may be provided to support variations in the training given based on biometric data. For example, the database 120 could store two or more different levels of complexity for one or more training modules of a training session. More generally, the database 120 could store a matrix of different variations in training modules. Thus, in one embodiment, during a learning session, the VR learning program could access different pieces of content as a form of adaptation. In some embodiments, the database also stores, or aggregates, information on an individual user's previous use of the system and for uses by other participants. This historical data may, for example, be used to generate training data, as described below in more detail.

In one embodiment, a predictive engine 112 is included either in the biometric analyzer 110 or server 115 to analyze the cognitive mental state metrics and determine when the training should be adapted. In that sense, it functions as part of a training mode adapter to generating training mode adaption commands. As examples, the predictive engine may, for example, include rules, tables, or a trained machine learning model to examine a current set of cognitive mental state metrics and determined adjustments to the training session to maintain learning efficacy. In one embodiment, the predictive engine 112 is making predictions about the user's response to an educational session and determining training mode adaptations that may be required to maintain the education session within an educational training zone having metrics compatible with effective learning.

As an illustrative example, suppose a cognitive load metric is rising and that an anxiety level metric is also rising. To prevent the user from become over-stressed, the predictive engine 112 proactively adapts the training session to maintain the cognitive mental state metrics within a desired range associated with healthy learning. There are many different ways this can be done. As one example a set of upper and lower thresholds can be determined for individual cognitive mental state thresholds. However, more generally, dynamic aspects, such a rate of change, can be considered. The overall pattern of changes to a set of cognitive mental state metrics can be considered. For example, a user may currently be in a peak-learning mode but a rise in one or more of the cognitive mental state metrics may have trends that suggest that the user's performance will degrade in the near future. In this situation, reducing the complexity of the education session at a point in time before the peak-learning mode ends may be a useful strategy.

For example, stress hormones can build up in the human body and take a while to dissipate. Some individuals have a greater stress response than others. Moreover, a small fraction of the population is susceptible to being overwhelmed by stress in situations that trigger memories of traumatic experience, such as Post Traumatic Stress Disorder (PTSD). Preventing a "spike" in anxiety/stress may be useful to maintain the overall learning efficiency over the entire learning session. The predictive engine 112 could, for example, have upper and lower threshold values selected with a margin below the absolute minimum and maximum values to provide a cushion for dealing with human response time. For example, suppose an "ideal" learning situation would be to maintain a cognitive load below 90% and an anxiety level below 70%. However, in practice, lower maximum thresholds might be chosen, such as maintaining a cognitive load below 80% and an anxiety level below 60% to reduce the possibility of spiking behavior. In any case, the predictive engine 112 may be implemented in different ways to have an algorithm that monitors the different cognitive mental state metrics and that proactively adapts the education session in response. This may be called "learning in the loop," in the sense that the complexity of the educational content can be dynamically adapted, based on the biometric data, before the learning experience is substantially degraded. While a complexity level is one example of an adaptation, more generally other types of adaptation could also be performed. For example, a stress reduction technique could be inserted into the session, such as taking a break, playing a game, or doing a breathing exercise.

Figure 2:
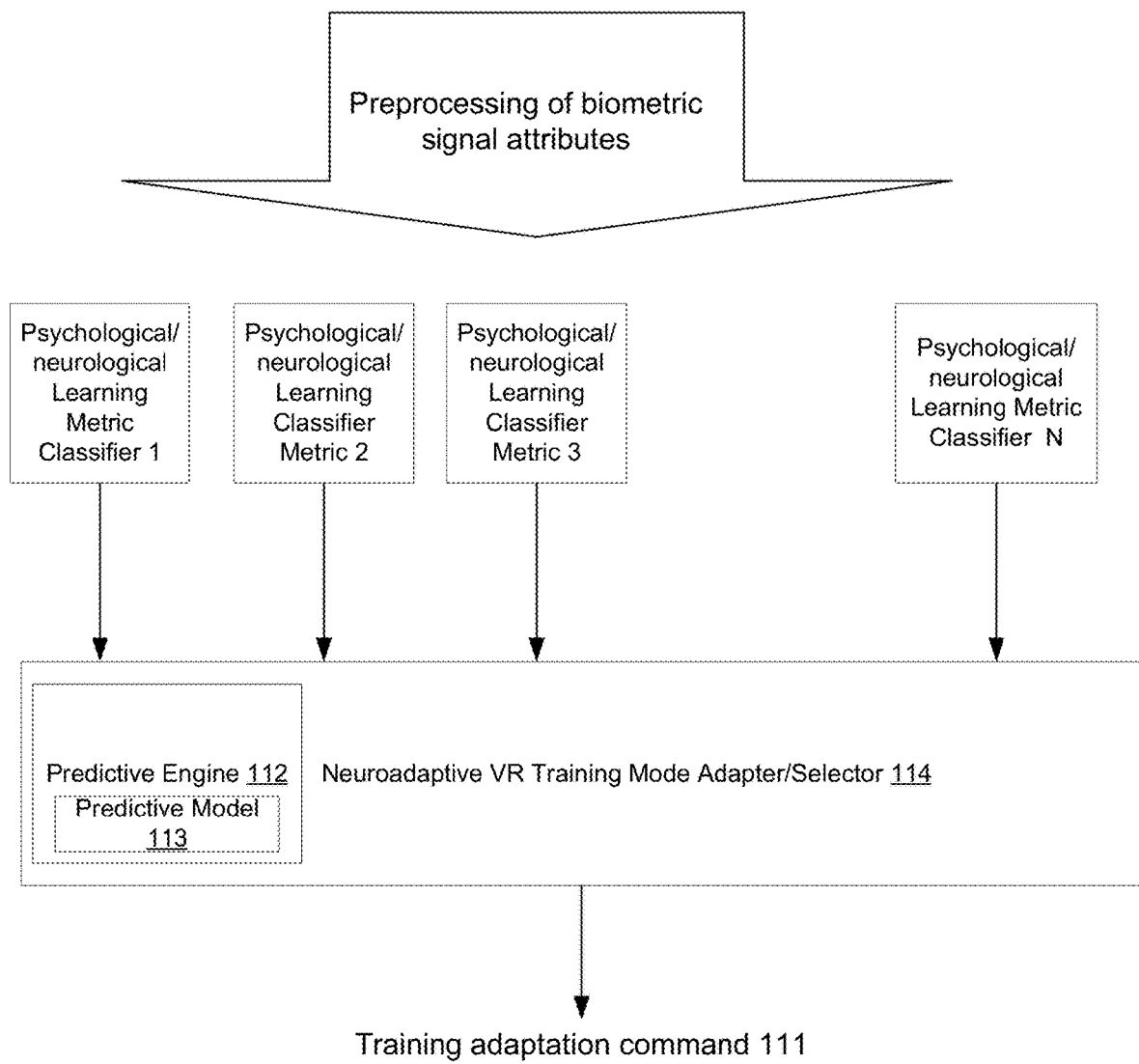
FIG. 2 is a block diagram illustrating a predictive engine to adapt educational training in accordance with an embodiment.
Figure 3:
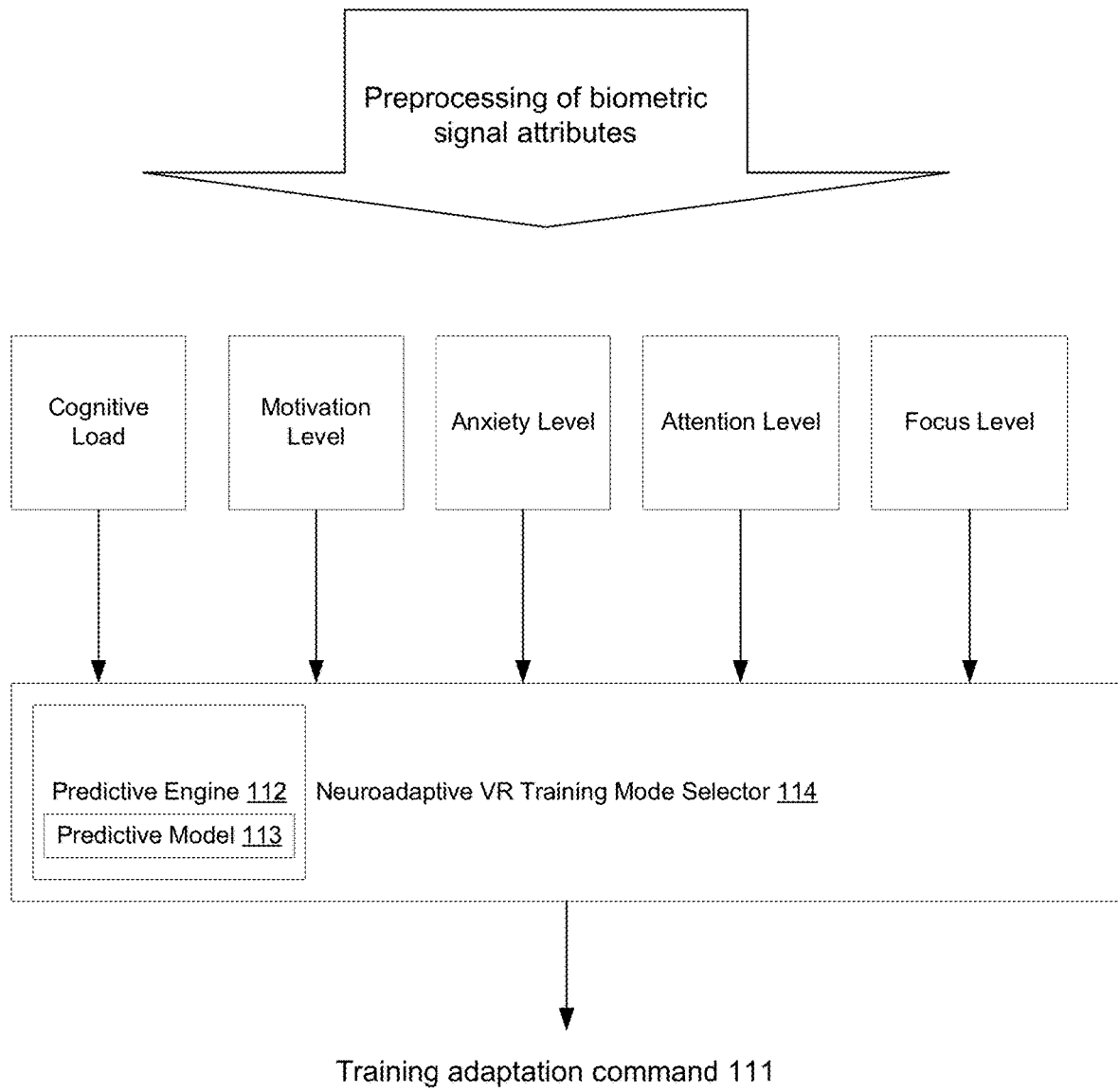
FIG. 3 is a block diagram illustrating a predictive engine to adapt educational training in accordance with an embodiment.

FIG. 2 illustrates an example of a general predictive engine 112 in an embodiment in which the predictive engine 112 is part of a module that generates training adaptation commands 111 based on an arbitrary number of different cognitive mental state metrics and FIG. 3 illustrates an example in which the cognitive mental state metrics include metrics generated by classifiers for a cognitive mental load, a motivation level, an anxiety level, and a focus level. It is an implementation detail regarding the form of the training adaptation commands output by the predictive engine 112. For example, the training adaptation commands 111 could be a command in the form one or more numbers or codes indicating a desired mode change, such a complexity level (e.g., an integer 1, 2, or 3 for high, medium, or low complexity as one example) to indicate changing to a different complexity mode. More generally, the output could be a set of normalized numbers, which are then used by other entities in the system to select training modules that are executed. For example, the predictive engine 112 could be implemented to output a complexity command code to signal an increase or decrease in the complexity of the training. A rest break or relaxation command code or number could be output to single the desirability of break in the training as another example. Other commands codes could also be generated to account for common training scenarios. Alternatively, the predictive engine could issue training adaptation commands in the form of direct decisions on particular training modules that are to be used in a training session.

In one embodiment the predictive engine 112 is implemented as part of a controller 114 that includes the predictive engine 112 and a predictive model 113 to select a training mode and generate the training adaptation command 111. For example, the controller 114 may include a processor, memory, and computer program instructions. In one embodiment, the predictive model is a trained machine learning model, although more generally in may comprises table, matrices, or other features selected to aid in making predictions about how to adapt an educational training session.

As previously discussed, the predictive engine 112 may be implemented in different ways. And as described below in more detail, data from a training session with the user (e.g., from a previous training session) may be used alone or in combination with data from other users as an aid to determine rules for making predictions. For example, in an enterprise training environment, a data set of a large number of participants may be used to identify relationships between the monitored cognitive mental state metrics and learning efficacy.

Additionally, an individual user may be given an initial training test session to obtain test data regarding their individual responses to different levels of test situations. For example, the training data (from a group of previous users) and the current user may be highly specific in terms of workforce demographics (e.g., blue collar technicians), training objective (e.g., training of empathy in a job interfacing with the public under different situations). Having test data and other data for the user and for a set of previous users provides a data set that can be used in different was to aid in making predictions.

In one embodiment, other non-biometric data may also optionally be utilized to aid in forming predictions, such as an aid in determining training data. For example, some enterprises perform psychological assessment studies of employees using common tests such as the Myers Briggs test. For example, introverts may suffer more from anxiety in a training for empathy than extroverts. Conversely, some extroverts may suffer more anxiety doing multitasking in a technical environment. Regardless of whether other forms of data are used, the training/test data generated for previous users and the current user can be selected to provide data from which a prediction engine 112 adapts a training session.

In one embodiment, a behavioral dashboard 125 provides a summary of the training and the cognitive mental state attributes/metrics during the training.

It will be understood that many possible implementations of the architecture of FIGS. 1, 2, and 3 are contemplated. For example, in an enterprise application, the server 115 and biometric analyzer 110 may be implemented by the enterprise using enterprise client/server architecture. However, one or both of the biometric analyze 110 and content server 115 could be implemented as a network service or cloud-based service. Moreover, as computing power increases, one or more of the biometric analysis 110 and content server 115 may be implemented at least in part on local computers (e.g., a user's laptop computer, tablet computer, etc.) or at least in part on a headset (which may, for example, include the headset used for the EEG).

As one example, a neuroadaptive VR learning program 117 supports a matrix of possible training variations. As one possibility, the complexity or pacing of the training could have two or more variations. However, more elaborate variations could be included to support a matrix of possibilities. For example, if a user becomes stressed in an empathy portion of a training session, a less challenging form of the training could be performed. Alternatively, the sequence of training could be altered to return to the remaining empathy training in a later portion of the training.

Figure 4:
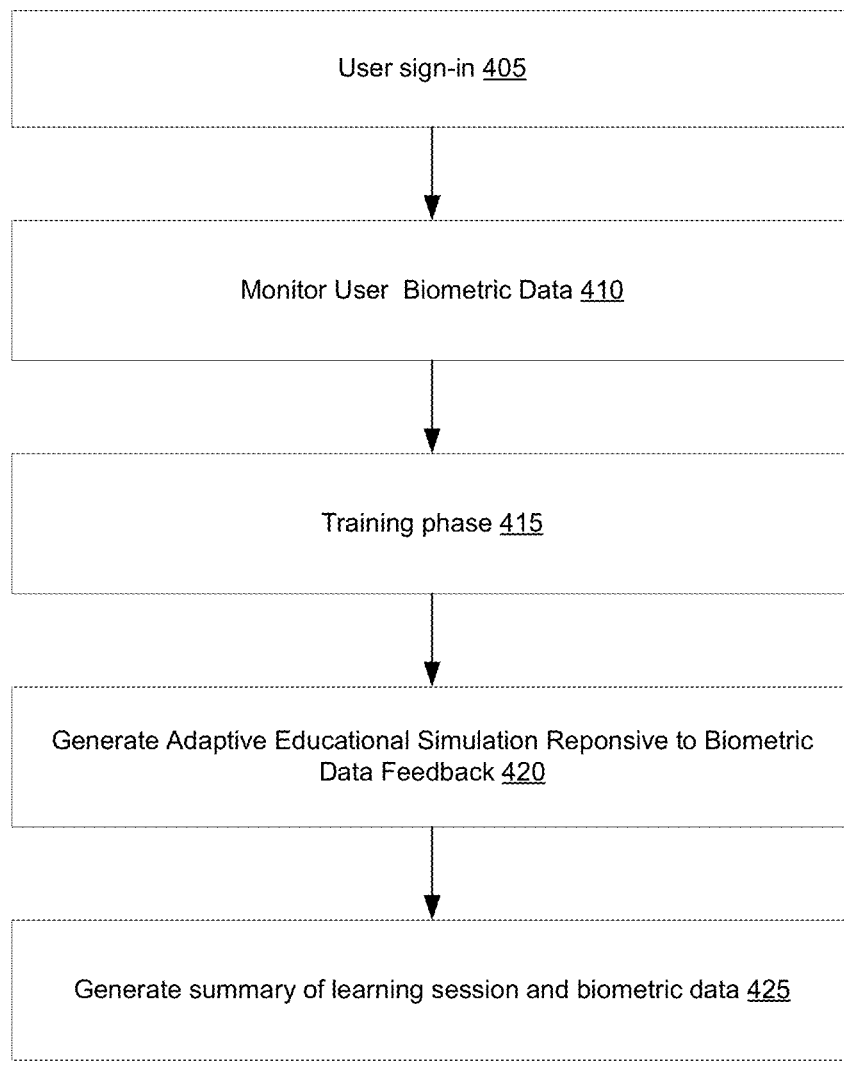
FIG. 4 is a flowchart of a method of performing adaptive educational training in accordance with an embodiment.

FIG. 4 is a flowchart of a general method in accordance with an embodiment. In block 405, the user signs in. In block 410 the biometric data of the user is monitored. In block 415, a training phase is initiated. One aspect of the training phase is that baseline data can be obtained to understand the user's response. This may include, for example, performing one or more surveys or tests to assess a user's biometric responses. For example, the tests may provide general psychometric data regarding how the user responds to different situations. Additionally, the tests may be selected to be similar to aspects of the training. Individual testing is useful because of the variations in individual behavior. For example, one individual may have high levels of background anxiety and stress in their life. Another individual may have low levels of background anxiety and stress in their life. There are a variety of other reasons why individuals may respond differently to a learning environment, including demographic factors like age, level of education, previous experience with VR training, etc.

In block 420, an adaptive educational simulation is generated that is response to biometric data feedback. Thus, the cognitive mental state metrics are maintained within a range conducive to learning.

Figure 5:
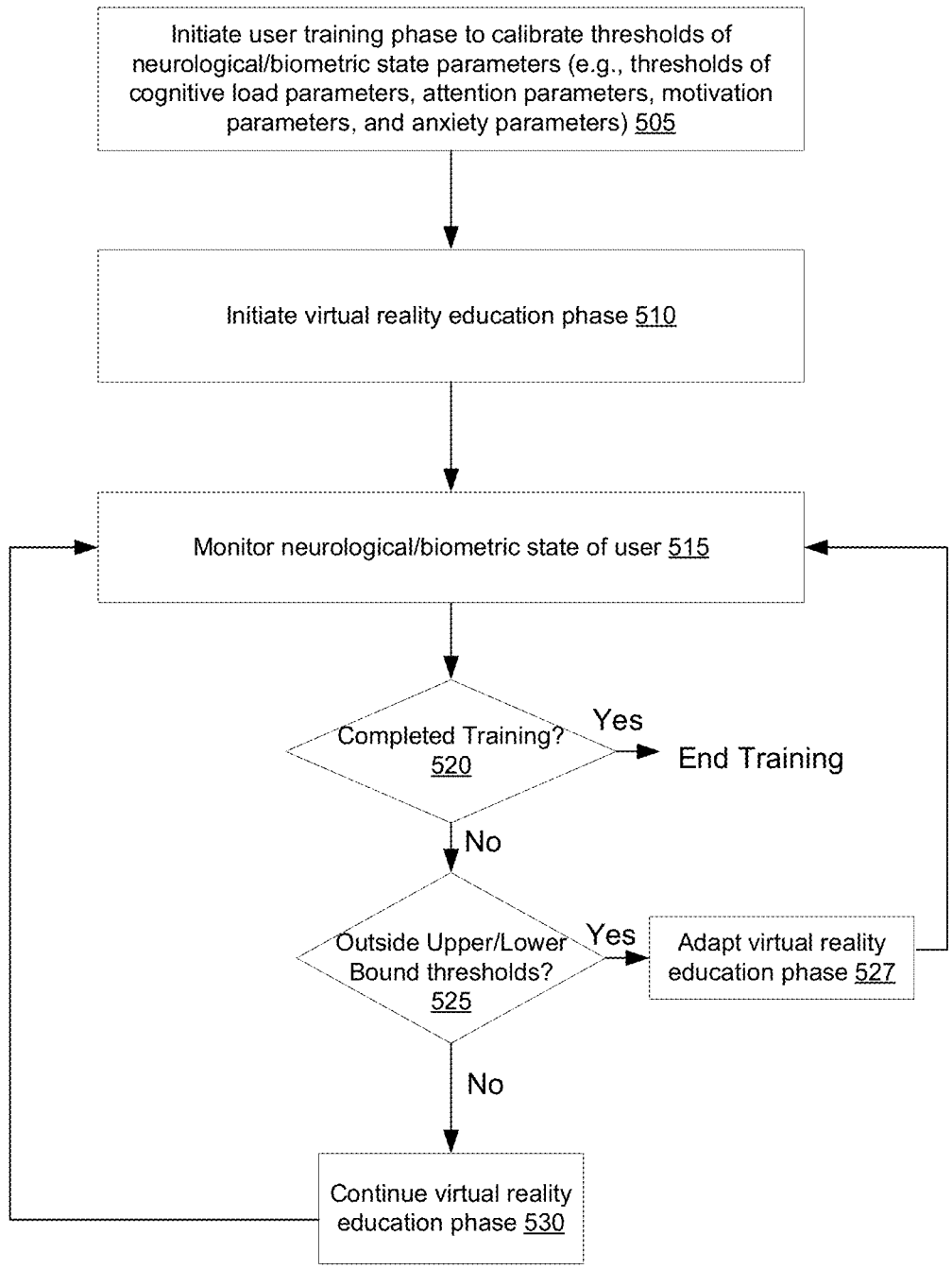
FIG. 5 is a flowchart of a method of using feedback to adapt education based on threshold values in accordance with an embodiment.

FIG. 5 is a flow chart of a general method of using thresholds in the cognitive state metric(s) to make decisions to adapt the training. In block 505, a training phase is initiated to calibrate thresholds of cognitive mental state metrics. The training phase may, for example, identify a threshold anxiety level predictive of a desirability to either reduce or increase the complexity level or the pacing of the training. For example, if the anxiety level is below a first threshold, it may be predictive that the complexity of the training can be increased, Conversely, if the anxiety level is above a second threshold, it may be predictive that the complexity of the training should be reduced to maintain an effective learning experience for the user.

In block 510, the virtual reality education phase is initiated. (It would be understood that in an alternate embodiment, the education phase may use augmented reality). In block 515, the biometric data of the user is monitored during the education phase to generate feedback in the form of the cognitive state metrics. This monitoring may be performed on a periodic basis at a rate that is fast compared with human behavioral/cognitive responses to educational training, e.g., once per second.

The biometric data is used to provide feedback during the educational session to adapt the training. As previously discussed, this may include adaptation such as selecting less complex training session modules, implementing relaxation breaks, changing in pacing or sequence, etc. In decision block 520, the process ends when the training is completed. Otherwise, decisions are made whether the cognitive mental state thresholds are outside of upper or lower thresholds. If they are outside of the thresholds, a decision is made in block 527 to adapt the education phase. Otherwise in block 530, the education phase is continued without adapting it.

Figure 6:
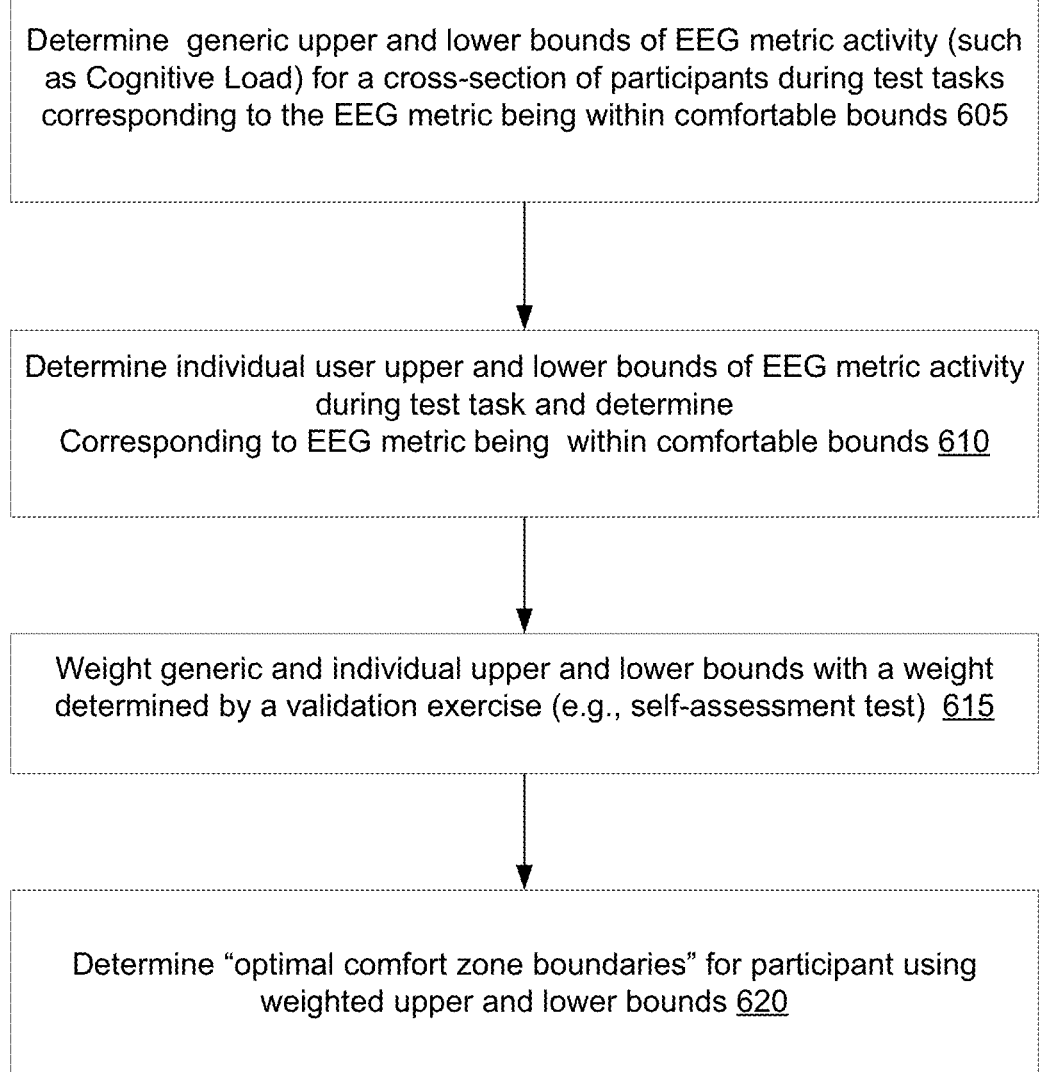
FIG. 6 is a flowchart of a method of forming individual thresholds, group thresholds, and weighted thresholds in accordance with an embodiment.

FIG. 6 is a flowchart of another method of using thresholds to adapt the education phase. In block 605, thresholds are determined for at least one cognitive mental state metric based on a cross-section of participants, such as a set of participants who previously performed testing or training exercises. This provides some information on a likely range of values for the cognitive mental state metrics to provide an optimal zone for learning based on objectives such as efficacy of learning, although other performance metrics could include, for example, enjoyment of learning.

In block 610, individual user baseline data and thresholds are determined during a test phase. This may also correspond to maintaining the metric within a desired zone.

In block 615, an optional weighting may be performed using the threshold information determined for the user and for the group of participants.

That is, the example of FIG. 6 would be compatible with using the individual user data, data for a group of a previous users, or a hybrid approach in which the user's individual data is weighted with the data for a group of participants.

One aspect of using a weighting approach is that it permits a reduction in the amount of training test phase needed for an individual. For example, a group of participants will have a distribution of responses. An individual user is likely to have responses falling (statistically) within the ranges of a statistically significant number of prior participants. Selecting a weighted value has some advantages over using only data from prior participants or only test phase data from the user.

In block 620, the weighted threshold upper and lower bounds are used to define an optimal zone for learning corresponding to a set of learning objectives.

Note that as an individual user continues to use the system, more individual data become available for them. For example, if a user goes through a series of lessons, there may be more historical data available from which to determine upper and lower bound thresholds for the user. However, for a new user, there is less data available, and there may be time constraints on the amount of time a training test phase can be performed. Thus, there may be use cases for which the weighted values provide superior results.

Figure 7:
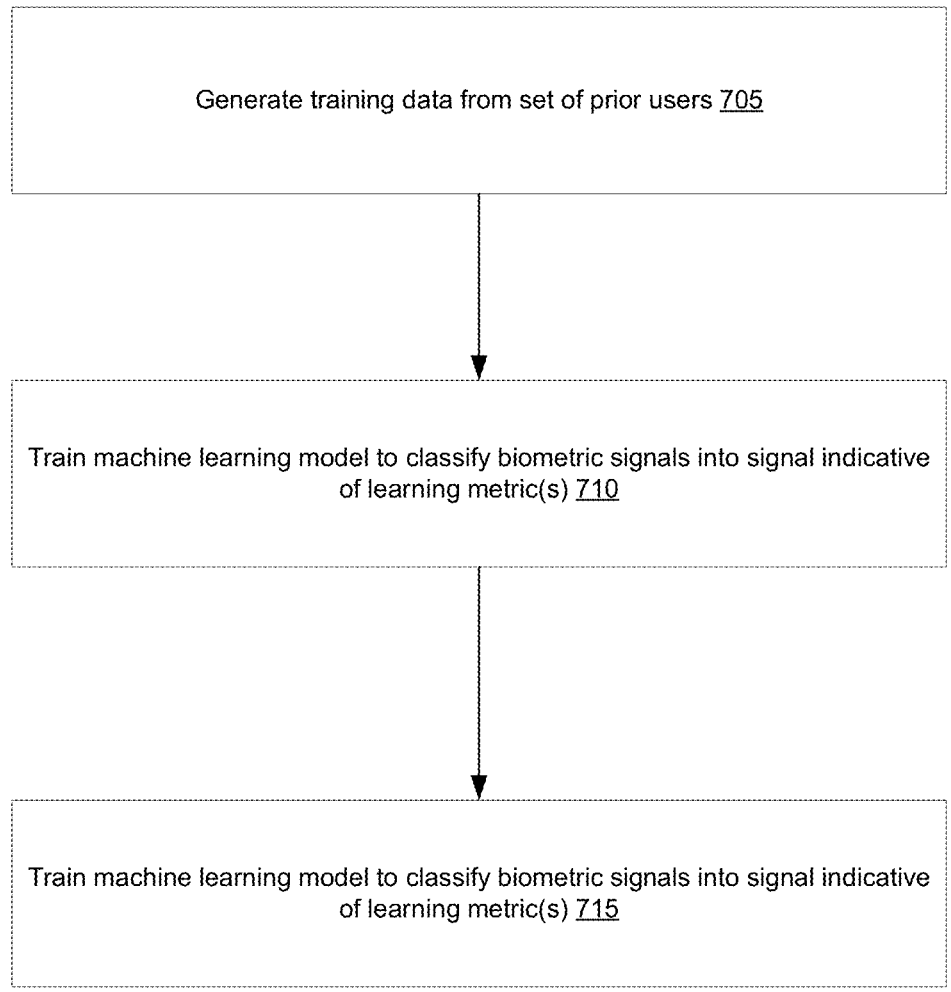
FIG. 7 is a flowchart of a method of using a machine learning training to convert biometric signals into learning metrics in accordance with an embodiment.

As previously discussed, in one embodiment machine learning techniques are utilized. FIG. 7 is flowchart of a machine learning method in accordance with an embodiment. In block 705, training data is generated from data collected for a set of prior users. For example, biometric data from a set of users may be monitored during testing or training associated with VR/AR training. For example, for a sales job, training data could be collected for instances of a training program conducted on a set of prior users of the training program. In block 710, a machine learning model is trained to classify biometric signals into signals indicative of cognitive mental state metrics relevant to learning. For example, human users could label training data based on a combination of objective and subjective factors for learning as a whole (e.g., highly effective learning, effective learning, non-optimal learning, ineffective learning) or for specific cognitive mental state metrics (e.g., cognitive load, anxiety, etc.). For example, a human user could label a section of the training, such as making an assessment if the student seemed over-anxious or was enjoying the training and learning well. In block 715, the trained machine learning model is used to classify biometric signals into signals indicative of a learning metric. Additional training could be performed regarding human users labeling segments of data as points in time when a proactive change in the complexity of an education session would have been useful. That is, the machine learning model could be trained to predict when and how to adapt an education session.

Figure 8:
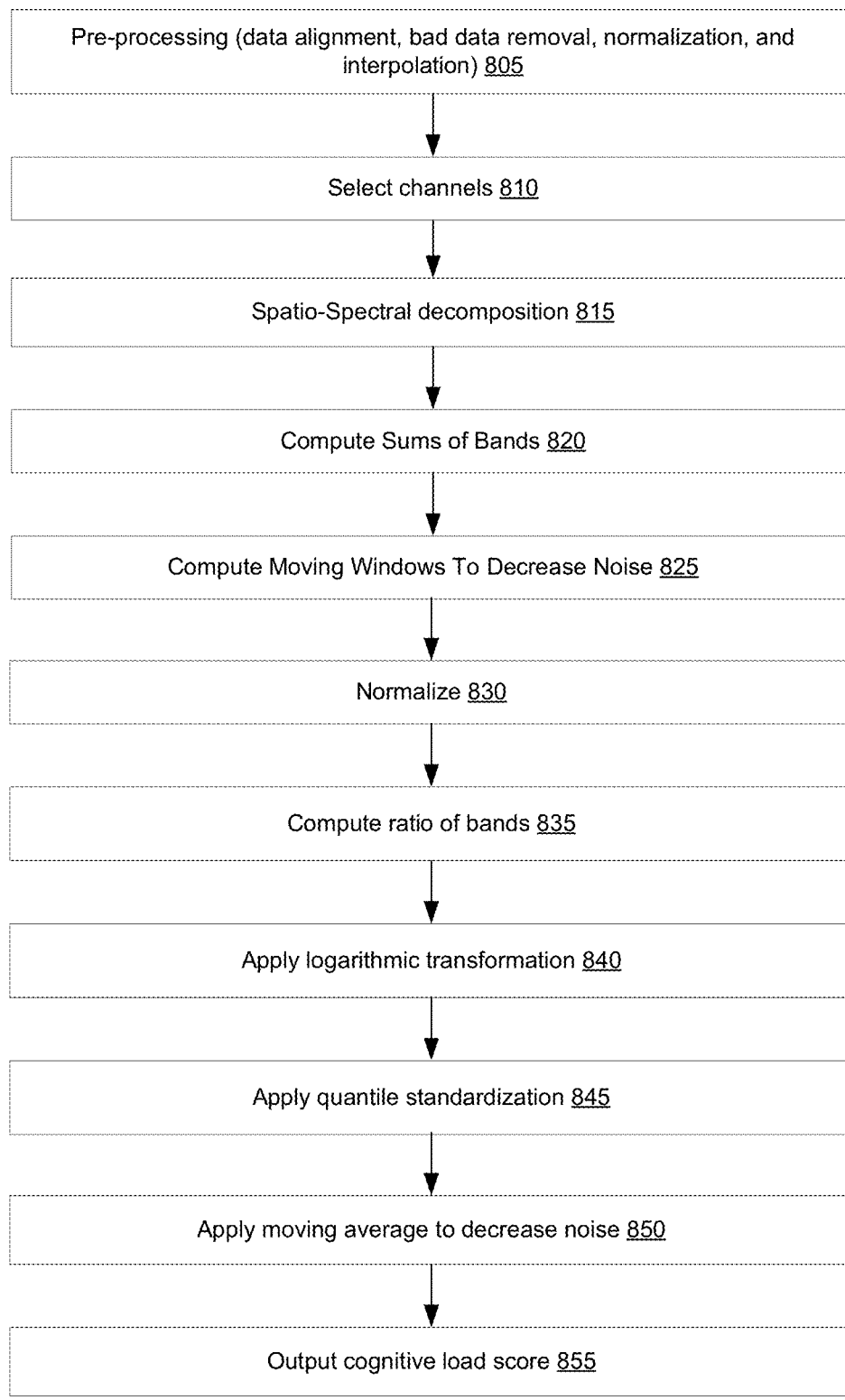
FIG. 8 illustrates an example of processing a raw biometric data signal into a cognitive load score in accordance with an embodiment.

FIG. 8 is a flowchart illustrating an example of transforming a raw biometric signal for EEG data into a cognitive mental state metric. Block 805 includes pre-processing of the raw biometric data, which may include aligning data, removing bad data, normalization, and interpolation. In block 810, individual channels are selected. For example, with EEG data there may be different frequency band components that correspond to different channels. Additionally, there may be a spatial response over different sensors on a user' head. Other steps 810, 815, 820, 825, 830, 835, 840, 845, and 855 can be performed to analyze the selected signal components in a spatio-spectral decomposition, perform noise reduction and normalization step to generate a cognitive load score. In this example, the selection of channels and other factors are chosen based on the cognitive state metric that is being scored In this example, it will be understood that empirical or heuristic techniques may be used to determine the associations between brainwave patterns and cognitive state metrics relevant to learning. For example, aspects of brainwaves associated with a cognitive load may be based, in part, on studying a group of test subjects who are objectively and subjectively challenged by a learning exercise.

For example, EEG data may include different frequency components corresponding to different mental states. For example, different frequencies and patterns of brainwaves have different association with overall mental activity and mental states. However, many other aspects of brainwaves have correlations to different mental states that may be relevant to learning.

Figure 9:
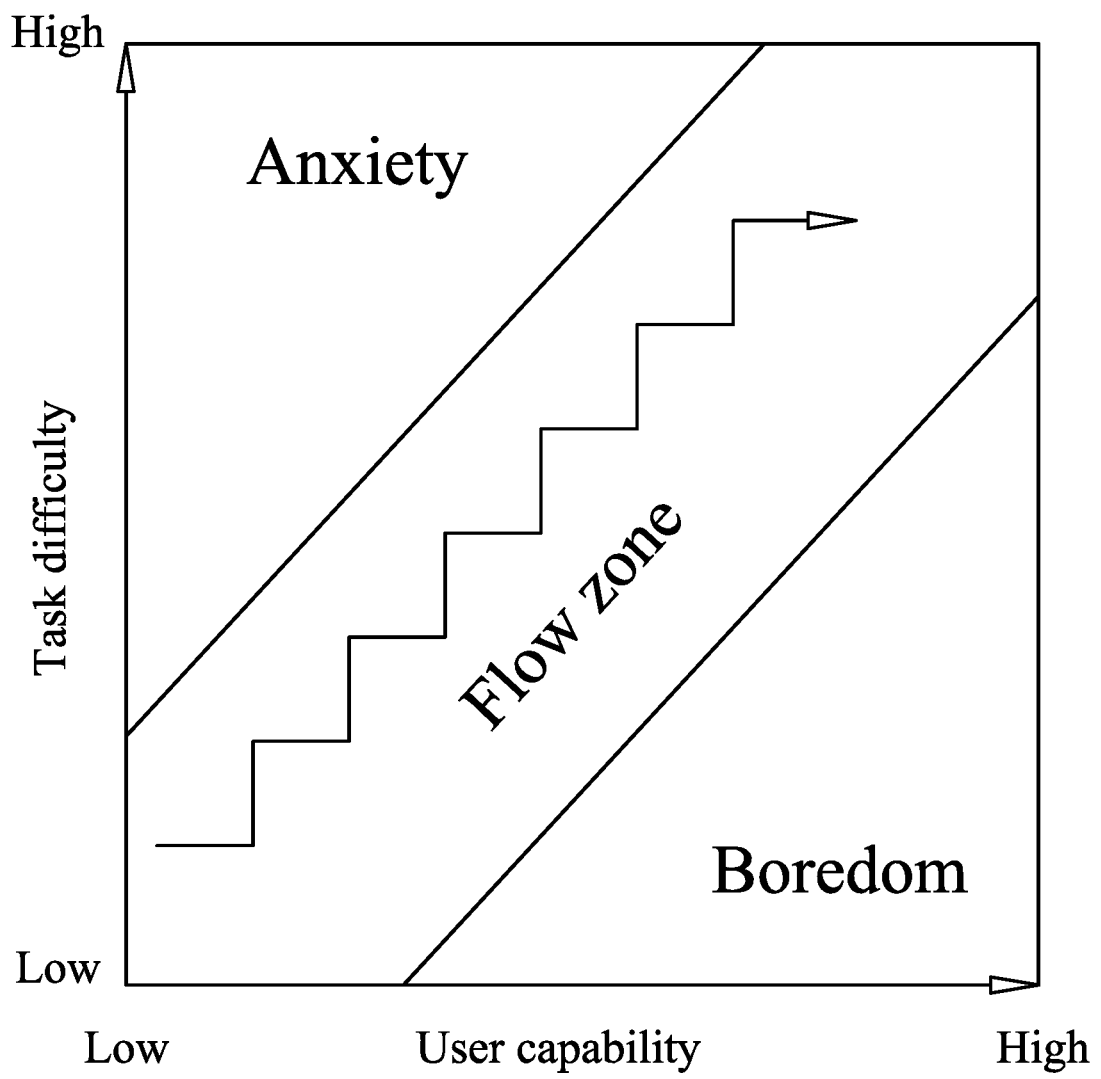
FIGS. 9-10 illustrate aspects of learning.
Figure 10:
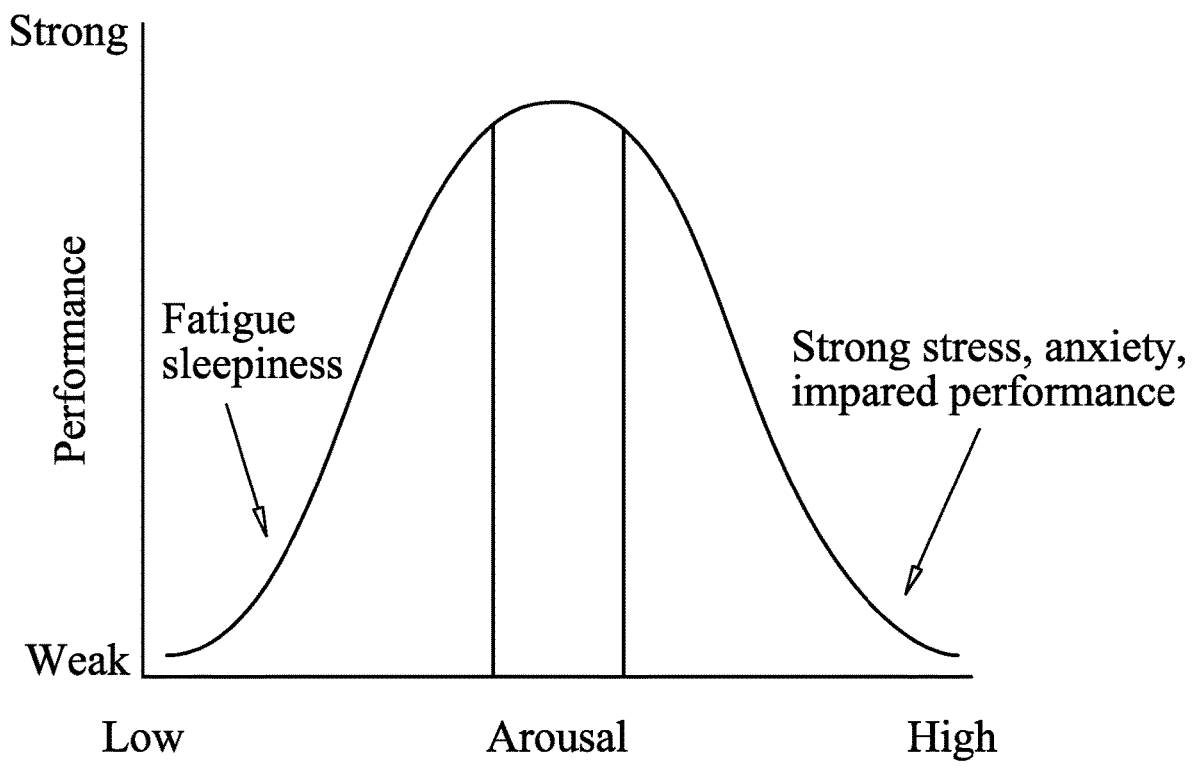

The efficacy of learning depends on many different factors, as indicated by FIGS. 9-10. For example, for many tasks, there are optimal ranges of arousal. Too little arousal corresponds to fatigue, boredom or sleepiness. Another way to consider this is that there is an optimal level of task difficulty, with respect to user capability, in order for optimal learning performance to be achieved with low levels of anxiety and boredom.

Note that an individual educational training session may have a performance metric defined for it. For example, maximization of learning could be one objective. Alternatively achieving a balance about effective learning and joyful learning could be a different objective. For example, in a ten-part set of educational training sessions, it might be a useful strategy to have a performance objective of joyful learning in the first session to create a positive experience for user's new to VR/AR training. Later sessions might emphasize maximal learning, as one example. There might even be individual examples in which creating high levels of anxiety or stress may be useful, such as in an empathy training course that has the objective of teaching what it is like to be anxious or over-stressed.

The use of the biometric data to provide feedback permits the training to dynamically adapt to optimize learning.

For example, certain quantitative sensor readings of biological functions, such as brain wave activity, heart rate and galvanic skin response, can be currently used to know if an individual is experiencing certain qualitative dispositions, such as boredom or fatigue, emotional engagement, motivation and attention.

However, there are practical difficulties in using brainwaves alone to control. For example, eye tracking data is strongly correlated with user attention. Voice stress analysis can be used, in combination with other biometric data, to monitor stress/anxiety. For example, in an empathy training for a customer service job, monitoring different types of biometric data permits broader insights than relying on a single type of biometric data. Using two or more different types of biometric data permits a much richer understanding of cognitive mental states related to learning.

Learning is challenging because educational and training systems are built for a mass or general audience, even though the way people most successfully learn varies from person to person, and from moment to moment for any one individual. Additionally, the influx of technological devices and constant communication into everyday lifestyles has led to increased learning difficulties that may be related to attention, engagement, or sensory processing abilities.

There is longstanding research to support the idea that many individuals struggle to succeed with learning or training curriculum designed for a mass audience. There is also evidence of the detrimental impact that technology has had on our ability to retain and learn information.

The reactions of an individual to external and internal factors can be detected by sensing biological feedback, such as brain waves, to generate biological data to determine the state of an individual and determine how that state impacts the performance during a learning exercise.

Additional examples are described below for embodiments of different EEG headset implementations.

1. Example 1: Adaptive Intelligent Learning System and Method Utilizing Biofeedback An embodiment of the disclosure creates a new learning system including: individual data-gathering devices and methods; an aggregate, anonymized database of user performance; predictive models generated using the aggregate database that allow the system to synthesize and translate individual data inputs into corresponding recommended actions; user devices; and learning programs, all such components being connected via a network or alternatively, not on a network depending on the desired application. The learning system of an embodiment of the disclosure analyzes and synthesizes user inputs that are gathered from sensors, surveys, observations and other sources to preferably augment, modify, or create a learning environment that is tailored to be most effective for the user at that specific moment in time.

Each time biological data is gathered from an individual completing a learning routine, that data becomes part of an aggregate database. Modeling that data using machine learning can create a system to predict how a user will perform in a certain learning routine. This system allows for scenarios where the individual data set that is being generated in real time is compared against known trends in the aggregate database in order to enact changes to the learning environment that are predicted to improve that user's performance of the learning routine, such as changes to content style, color or speed. The system also gives commands to the user such as to take a break.

In an example of the learning system of an embodiment of the disclosure, the determination of effective learning conditions for a user is accomplished by predicting a user's performance, based on a comparison against known performance trends identified by the aggregate database. The predictive models that are created and continually refined using the aggregate database allow the system to create a real-time feedback loop that drives learning programs to be modified in the course of an operational routine. For example, consider students taking a reading comprehension test. While taking the test, they are wearing a headset that collects brain wave data and feeds it into the database. By analyzing brain wave data, the system can identify if their workload levels spike into a territory that indicates cognitive load, which we recognize as overload or stress, or boredom. By comparing that indicator to the database, the system can instantaneously predict what change should be enacted to reduce the individual user's cognitive load and send a signal back to the learning software to enact a real-time change such as providing a simplified version of the same content prior to the user completing a quiz of their comprehension of the section.

The learning system can also be used even when the environment is static, by analyzing user data such as brain waves to provide supplemental training activities or recommend next steps to improve learning performance. In the reading comprehension example above, rather than enacting real-time changes to the system the user data could be analyzed in comparison to the aggregate database to provide recommendations for follow up exercises to improve retention of the content. Further, over time the aggregate database can be used to create learner profiles, and by matching individual users to those profiles there are additional opportunities for tailored learning exercises based on what the system knows about that profile's typical performance.

An example use case involves the gathering of qualitative and quantitative user input data before, during, or after a learning or training routine. The system is devised that it can take the processed information from a computational resource and detect user attributes, such as concentration, fatigue, stress, etc. and modifies an existing or custom learning routine in order for the user to obtain improved learning outcomes such as better retention or performance.

In an embodiment, a headset is used to capture user data and then transmit that data using an on-board computer to a networked server that hosts the aggregate database. This allows the system to conduct most of the heavy computing work in the cloud instead of on the headset, as well as run predictive algorithms based on the aggregate database with a computing power great enough to deliver a real-time signal back to the user's device, which commands a change in the learning program in order to make that program more effective.

The data that is gathered in real time is fit into a model and the result of that model's output is sent back to the user. This could be in the form of a visual, auditory, physical, or other type of indication, such as a change in content color, a sound indicating it is time to take a break, or changing content from text to drawings for visual learners. The output can also predict performance for the given task. For instance, in a reading comprehension example, the output could determine which areas in the assigned literature were comprehended more than other areas, using timestamped data, image tracking, sensor readings, user inputs or the like to identify those areas. This would be accomplished through factors being determined through the data such as concentration, energy level, and fatigue and then those factors being applied to the model. This model is iterated over time in a continuous or non-continuous fashion. This could be a background or foreground function of the software.

Over time, each instance of making performance predictions based on user inputs and generating associated outputs will improve the system's ability to enhance individuals' performance within a given learning routine. Users can input their own data sets to augment the machine learning functions, such as surveys, independent sensor input, and other text entries. Once learning challenges have been identified, the predictive models could be applied to generate an associated feedback in the learning program that is most strongly correlated with success. This could be done with prompts, instructions, automated procedures, or the like. For example, in one case, if inattention is identified in the individual, they could be prompted with a simple instruction to stop and take a 15-minute break before continuing with the learning or training exercise.

The type of data being gathered include examples such as brain wave data gathered using an EEG headset, self-reported assessments of learning effectiveness and performance indicating mastery of the content taught during learning routines. These inputs are analyzed and then translated into a corresponding output action. In addition, using predictive analytics with behavioral triggers to reduce the compute power needed on that device.

The predictive capability created by fitting the aggregated input data from each individual user into models using machine learning techniques are unique because they identify learning challenges and predict appropriate output responses. These responses are delivered via the devices that interface with the user to create a dynamic feedback loop that improves learning outcomes.

In an embodiment of learning system and method of the present disclosure, a primary approach to acquire the necessary user information or user input comes in the form of a device or a plurality of devices placed on the user's head in order to acquire the electrical activity in the brain. One example of such a device could be an electroencephalogram (EEG).

Figure 11A:
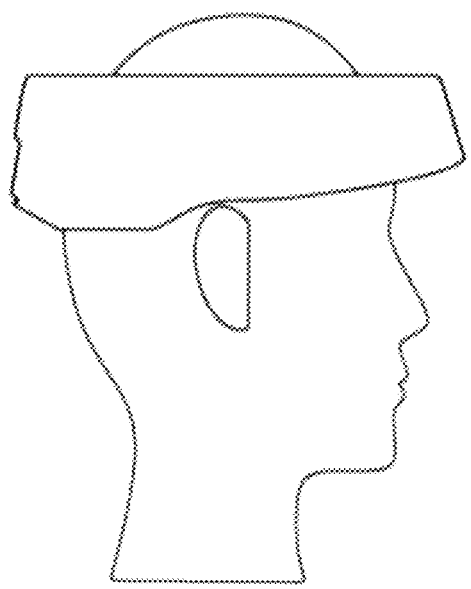
FIGS. 11A and 11B illustrate an EEG headset on a human head in accordance with an embodiment.
Figure 11B:
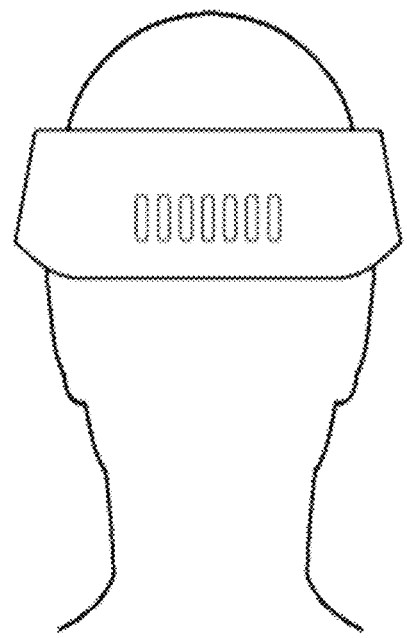
Figure 12:
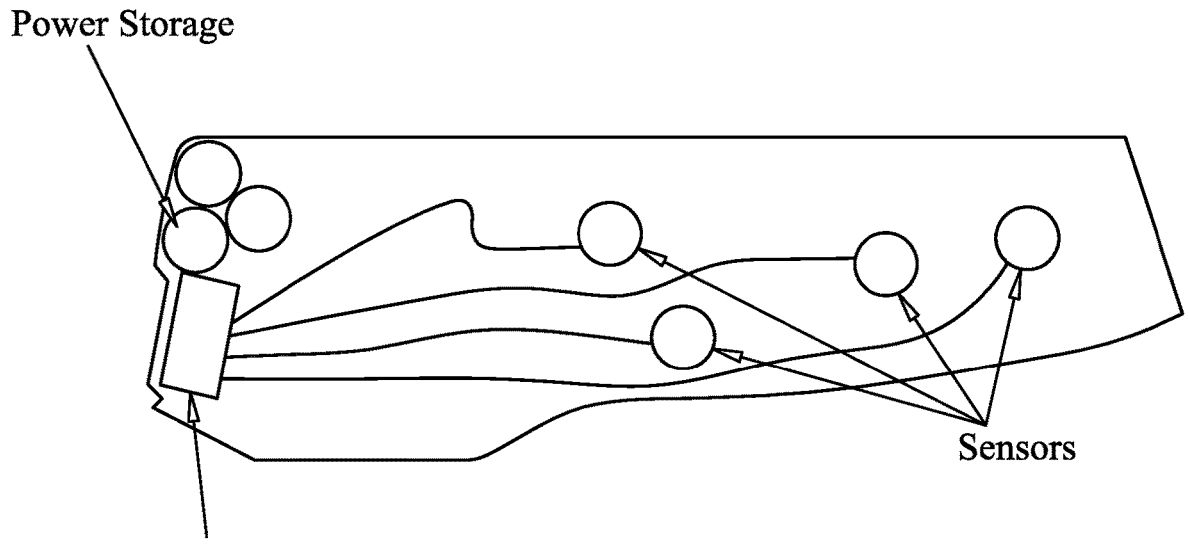
FIGS. 12A and 12B illustrate examples of an EEG headset internal component in accordance with an embodiment.
Figure 12:
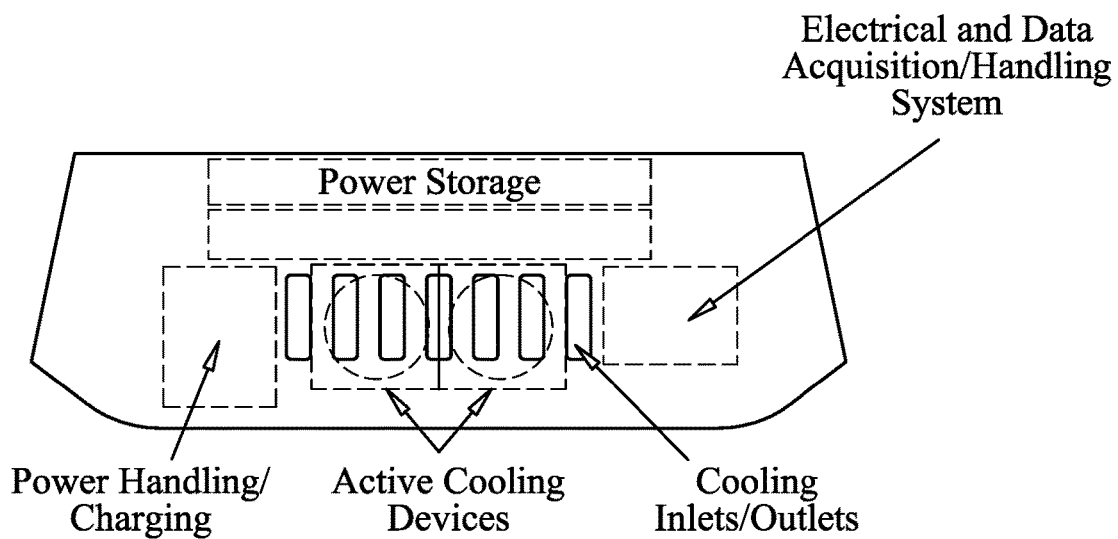
Figure 13:
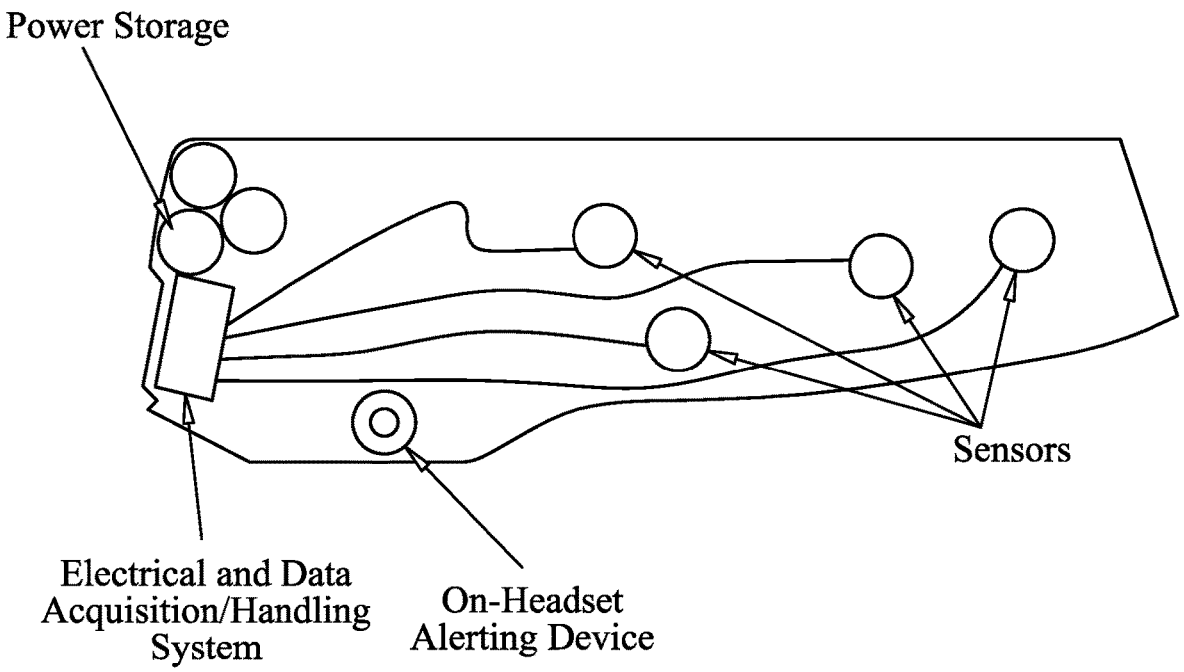
FIGS. 13A and 13B illustrate an example with an on-headset alerting device in accordance with an embodiment.
Figure 13:
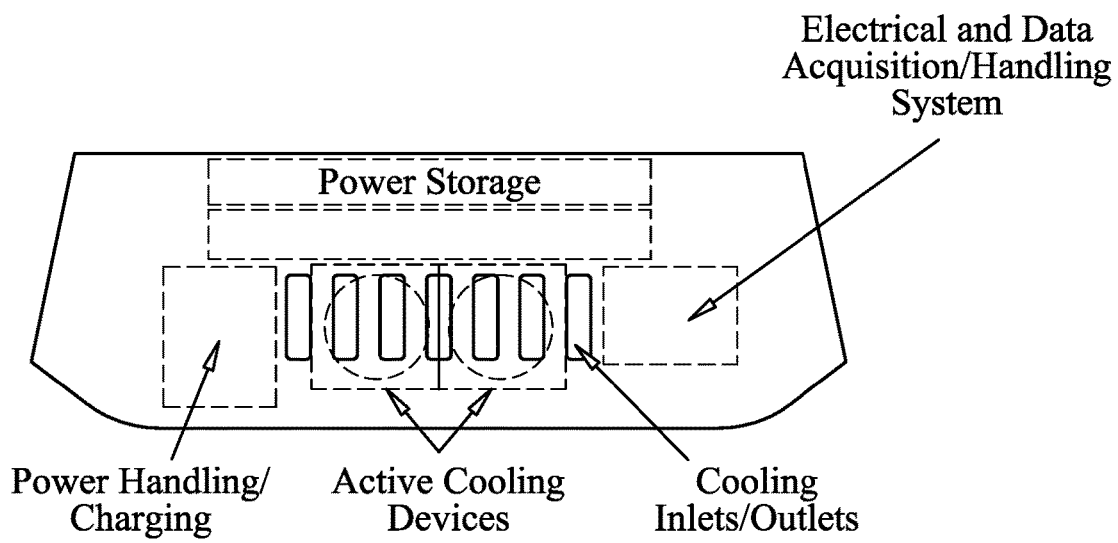
Figure 14:
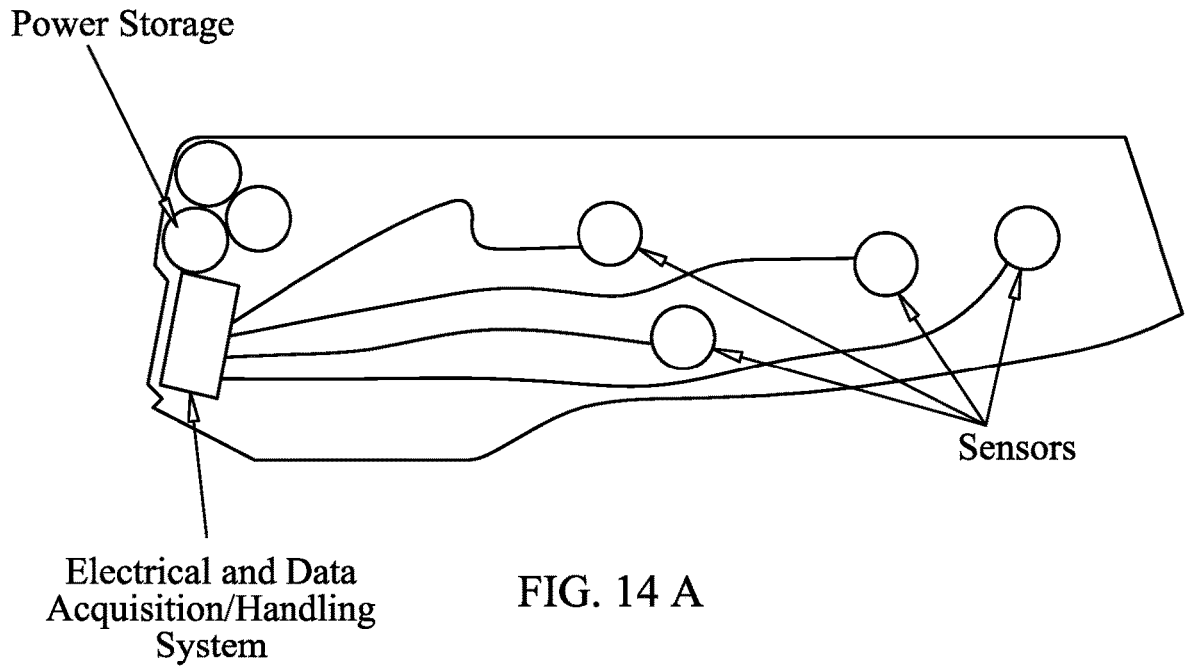
FIGS. 14A and 14B illustrate an example of an EEG headset without active cooling in accordance with an embodiment.
Figure 14:
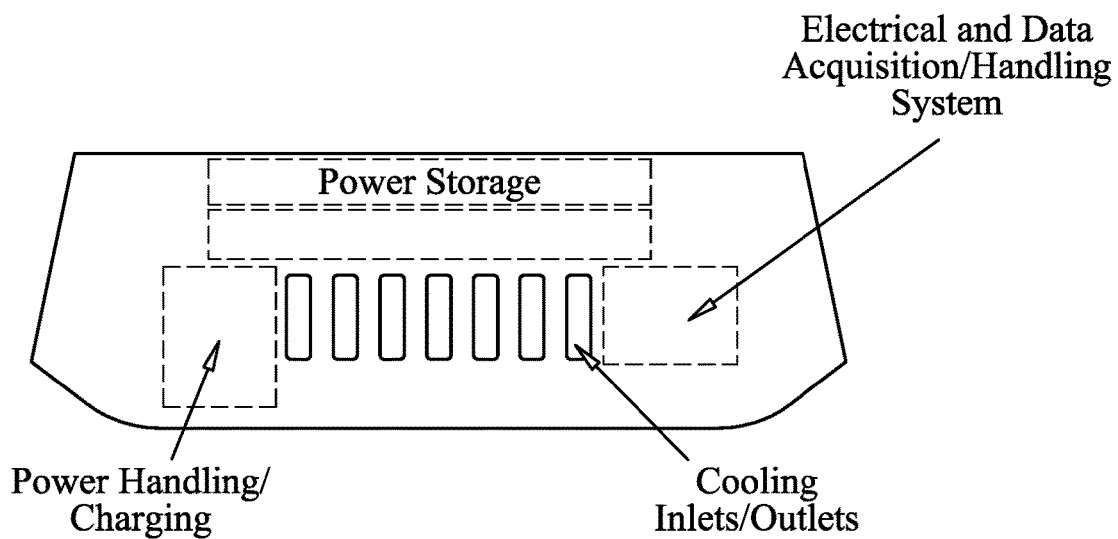
Figure 15:
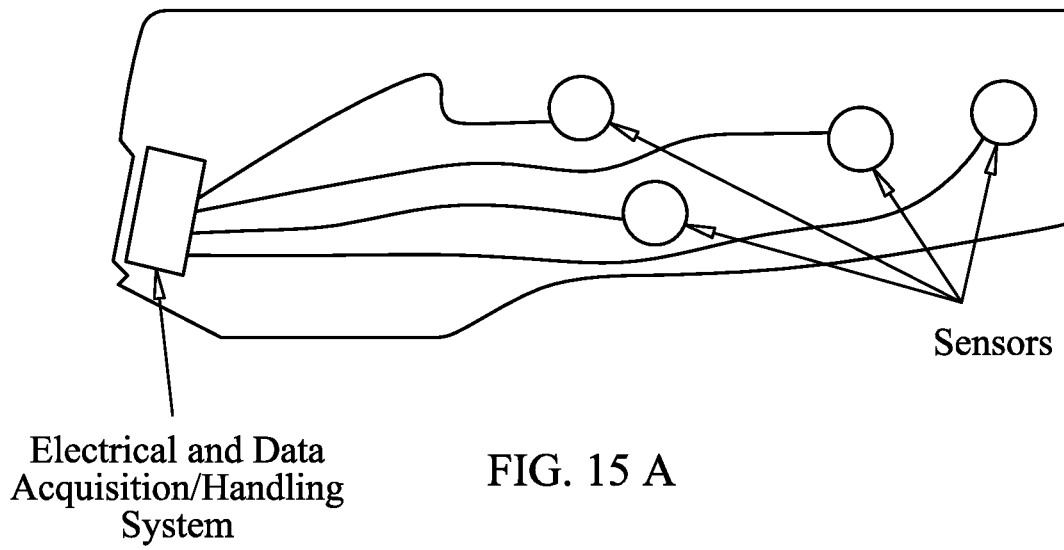
FIGS. 15A and 15B illustrate examples of an EEG headset without power storage in accordance with an embodiment.
Figure 15:
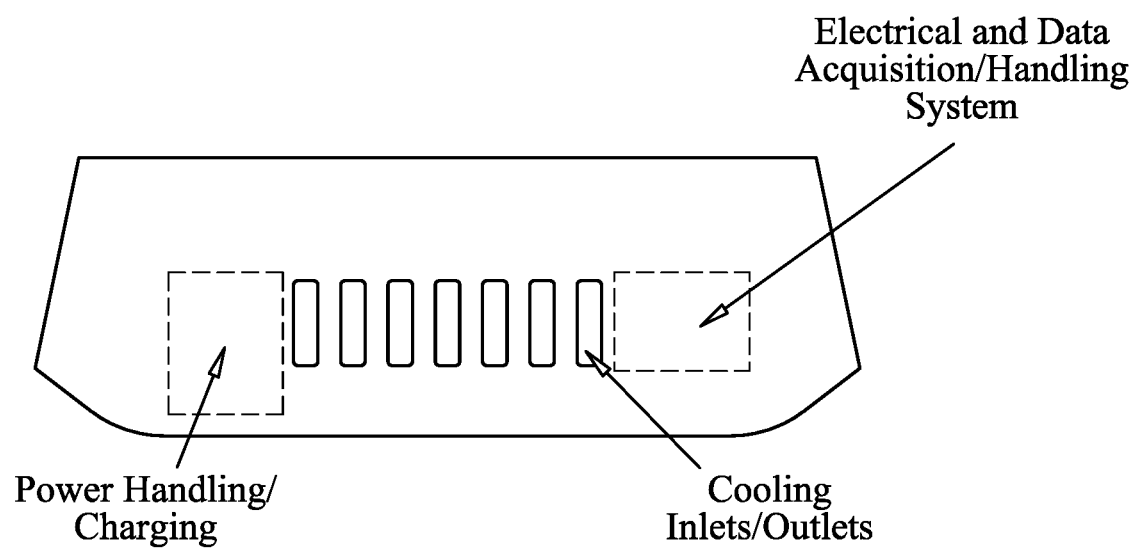
Figure 16:
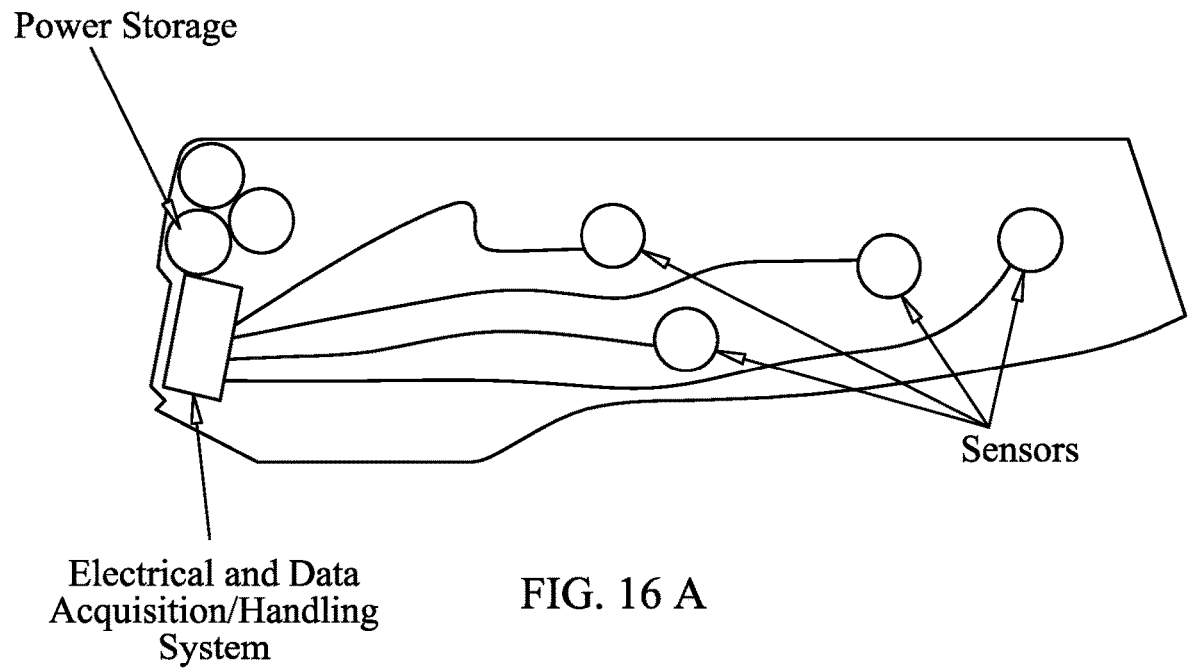
FIGS. 16A and 16B illustrate examples of an EEG headset with open power vents in accordance with an embodiment.
Figure 16:
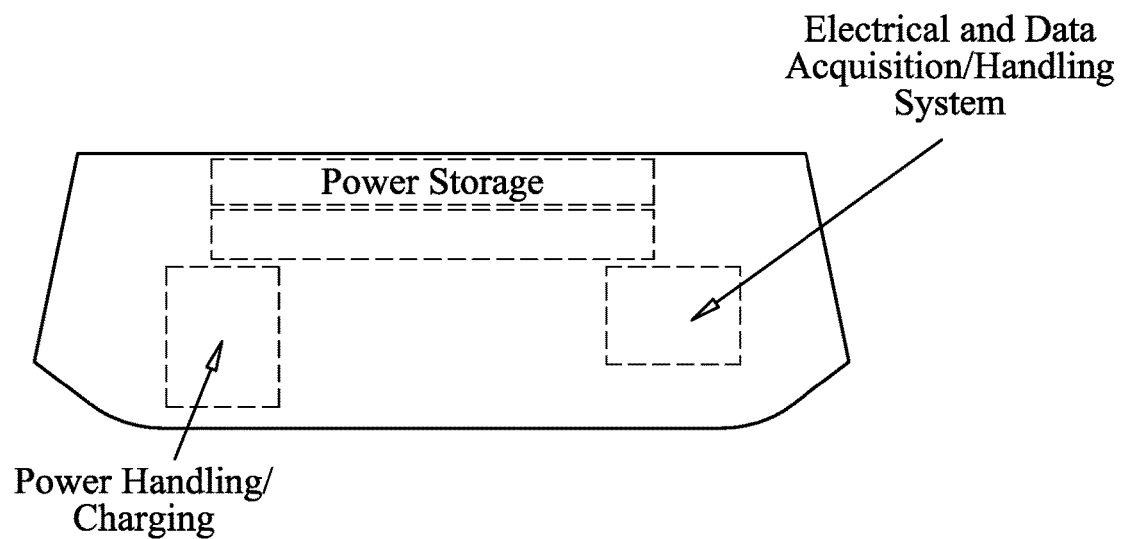
Figure 17:
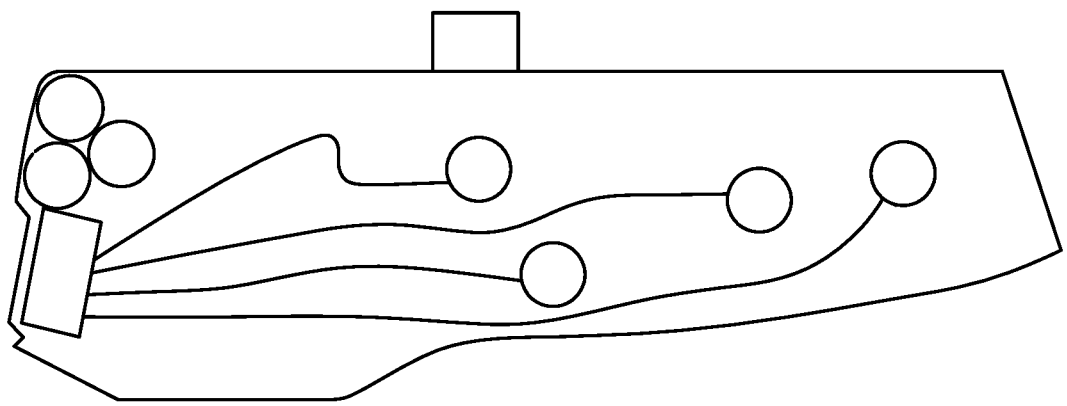
FIGS. 17A and 17B illustrate examples of an EEG headset with sensor blocks attached in a floating fashion, in accordance with an embodiment.
Figure 17:
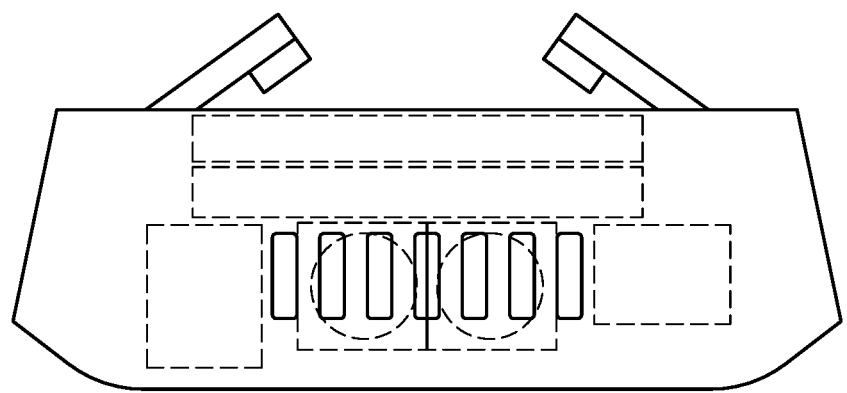

As shown in FIGS. 11a and 11b, such devices can be assembled into an integrated headset worn during use or, alternatively, be placed directly onto the head without a headset. Additional sources of user inputs can include data gathered from keyboards, touch screens, verbal input, eye tracking, sensor data, or from external observation equipment such as scanners (optical or other) or user questionnaires/surveys.

Referring to FIGS. 12-17, in an embodiment, a headset, in this example, is comprised of sensors, electrical and data acquisition/handling system, and power storage electrically coupled together by wires on a headband. In one embodiment, the headset includes power handling/charging, active cooling devices, and cooling inlets/outlets.

FIGS. 13a and 13b show schematic illustrations of the internal components of an embodiment of a headset of the present invention having an on-headset alerting device. This alerting device is intended to communicate with other devices, such as a cloud server for running predictive analytics programs, or directly with the user, or to hold information.

FIGS. 17a and 17b are schematic illustrations of the internal components of an embodiment of a headset of the present invention with sensor blocks attached to the headset in a floating manner.

Figure 18:
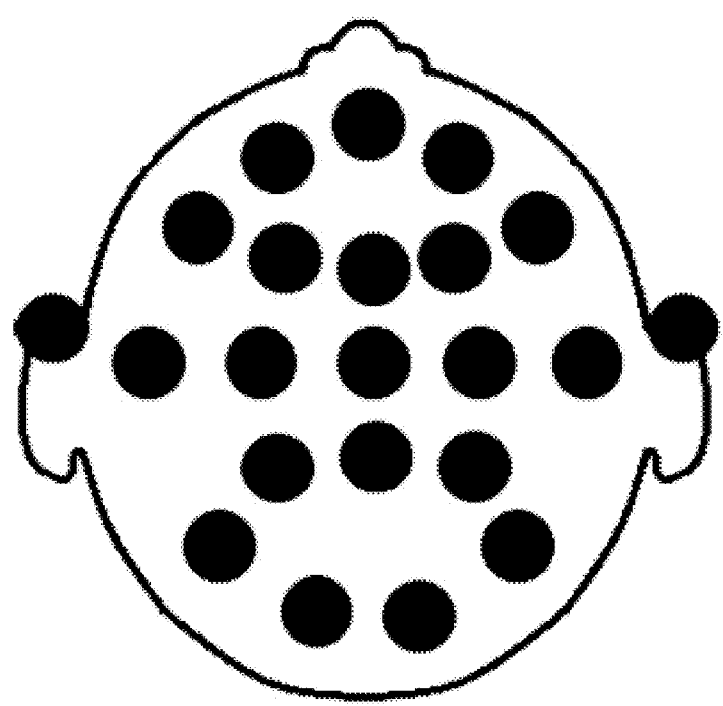
FIG. 18 illustrates possible EEG sensor locations in accordance with an embodiment.
Figure 19:
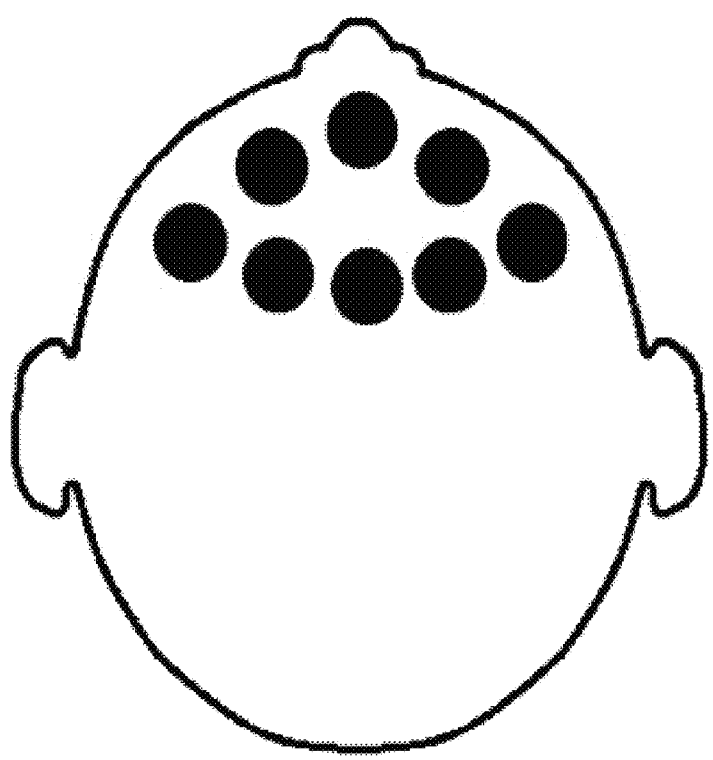
FIG. 19 illustrates possible EEG sensor locations in accordance with an embodiment.

The sensors are preferably placed in understood point locations around the scalp of a human head and also could include the ears as illustrated in FIGS. 18 and 19. Sensors preferably do not require conductive pastes, liquids, or other medium to collect data. However, it is appreciated that those type of sensors can be used in the system to collect the desired data.

Figure 27:
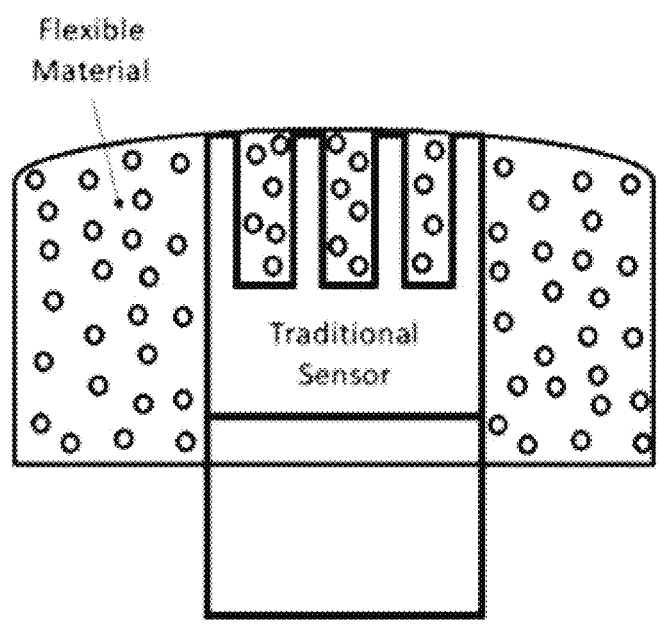
FIG. 27 illustrates a soft dry electrode with a dry sensor embedded in a soft flexible material in accordance with an embodiment.

As shown in FIG. 27, a dry sensor can be surrounded by a soft material, such as for example, silicone, fabric, plastic, cotton, other padding material, or rubber or the sensor itself could be made entirely from a soft or flexible material. The sensor can be embedded in material or can be attached to material. The sensor can be partially exposed, such as at the tips, or be entirely covered by material or other covering.

In one embodiment, a headset itself enables autonomous calibration so that a routine does not need to be run on the user in order to utilize the data obtained from the user. This can be done through normalization, transforms of the data, or trend algorithms and is backed by the machine learning routine that is created and updated over time. The signal gains from the sensors are adjustable in order to have adequate data quality to be utilized or sent to another device to be utilized. The signal can be utilized without and with filtering such as physical or digital filters. Physical filters could come as a piece of electrical hardware and digital filters could include software, a common example would be a Kalman filter but could be generic or highly customized.

Referring to FIGS. 20-23, in one embodiment, a user will complete a learning routine, either using a computer or another offline learning method, while wearing a headset device that may transmit data to other devices, or to the user, either while wired or wirelessly.

Figure 20:
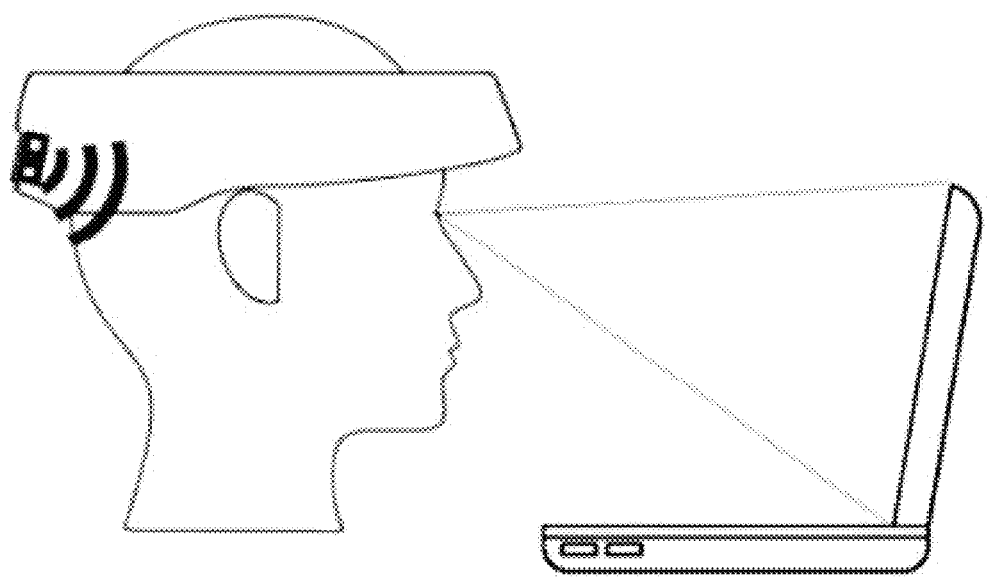
FIG. 20 illustrates a user interfacing with a computer while the headset data is fed back to the computer wirelessly in accordance with an embodiment.

FIG. 20 is an illustrative example of a user wearing a headset interfacing with a computer wherein the headset feeds back into the computer wirelessly. This could also include routines in which data is sent to a cloud server where it is processed and analyzed using machine learning algorithms before sending some modification instruction back to the learning software the user is studying. This data is processed off the headset so that the overall compute power requirements are lowered and allow for a real-time change to be delivered to the user.

Figure 21:
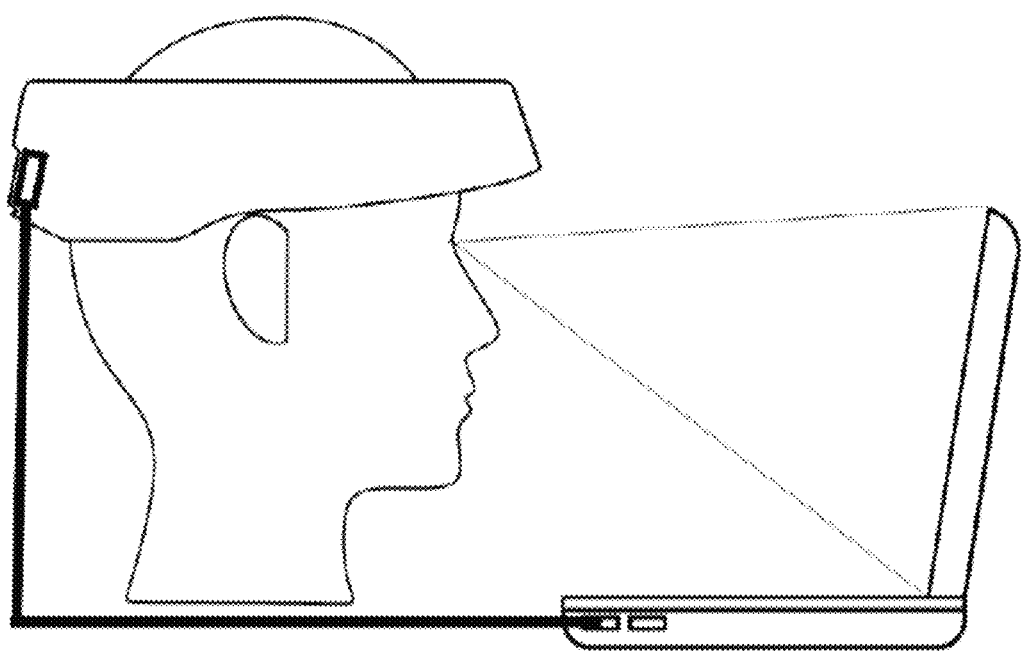
FIG. 21 illustrates a user interfacing with a computer while the headset data is fed back to the computer with a wired link in accordance with an embodiment.

FIG. 21 is an illustrative example of a user wearing a headset interfacing with a computer wherein the headset feeds back into the computer over a wire. This could allow for other routines that are locally processed in order to deliver feedback to the user.

Figure 22:
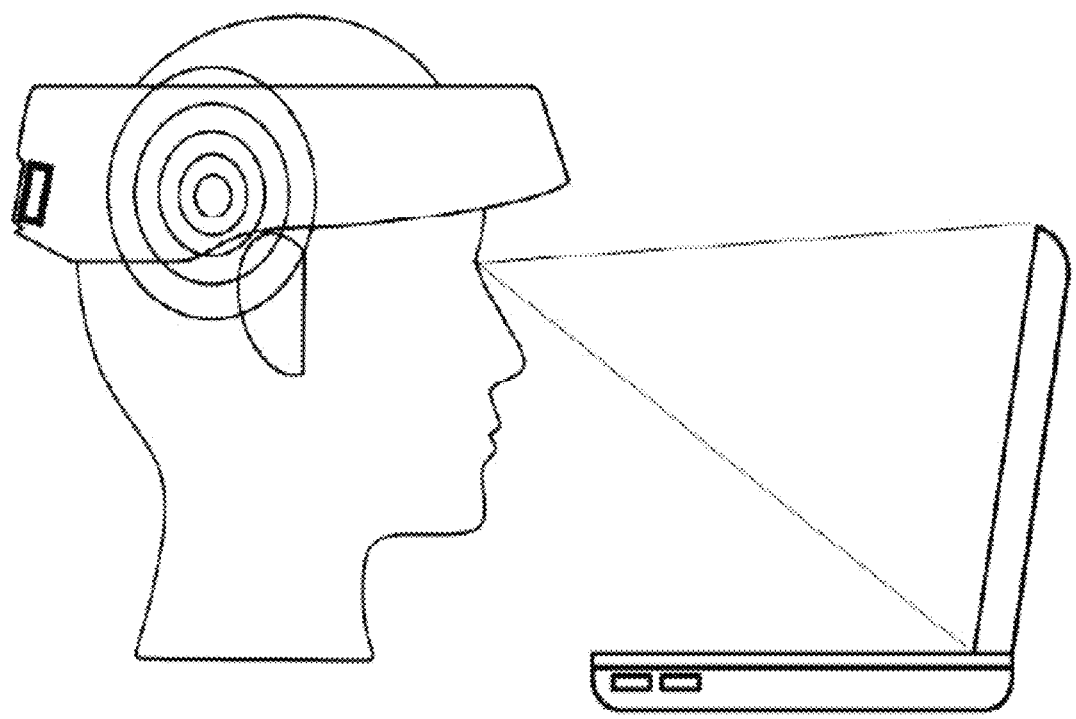
FIG. 22 illustrates a user interface with a computer with the headset giving direct feedback to the user in accordance with an embodiment.

FIG. 22 is an illustrative example of a user wearing a headset interfacing with a computer wherein the headset gives direct feedback to a user. For example, the colors used in a learning program could be changed to highlight different sections of content.

Figure 23:
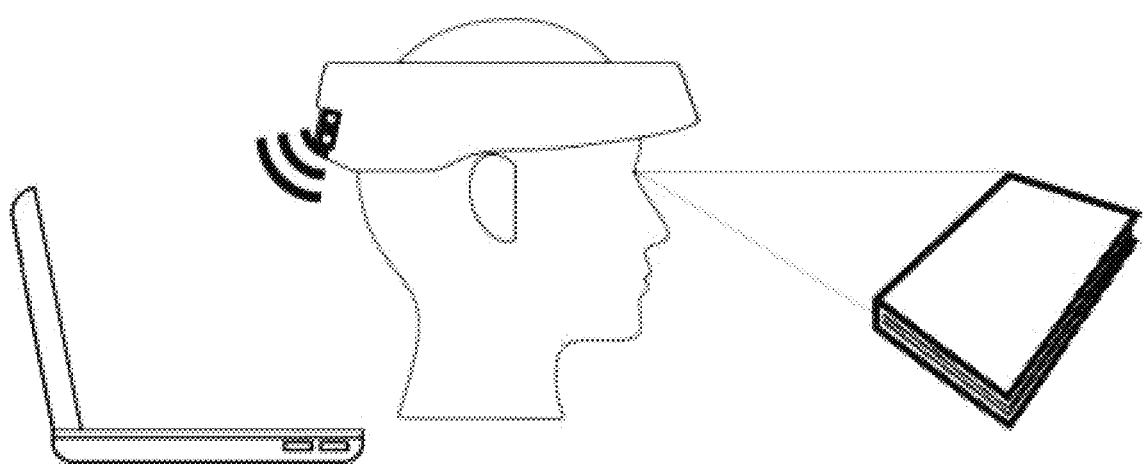
FIG. 23 illustrates a user interfacing with non-computer materials with the headset data being fed back to a computer wireless in accordance with an embodiment.

FIG. 23 is an illustrative example of a user wearing a headset interfacing with non-connected material such as a book, wherein the headset data feeds back into a computer wirelessly. This data could be used to provide recommendations to the user after they have finished the learning routine, and will be added to the aggregate database to improve the overall accuracy of functional models that are used in the machine learning routines.

The software routine that is run could take many forms. The routine could be run on the same device gathering inputs, a separate device, or a device running other software needed. One conceived permutation involves using the described innovation in order to enhance or augment the learning process. For example, the routine could involve a highly efficient deep neural network model that can predict outcomes based on inputs. This routine can become more accurate over time through machine learning operations that utilize the inputs to become more accurate in the predictions as more data is gathered. The routine can also be stagnant and not change over time. For example, an enterprise may want to train employees safe procedures for working in a facility. The system may be able to identify that based upon the speed with which a user completes the questions, they are not actually spending enough time to absorb the information. The system may then be prompted to provide more difficult testing questions that require critical reasoning, rather simple questions that would only require a rote memorization of the content being presented.

The routines could utilize standard or quantum-based computing. Data for the machine learning operations can be gathered from sensors like the described headset or be given directly through a file upload or some similar operation.

For example, a server may include a processor(s) and a memory. The processor(s) may be any suitable processing device, such as a microprocessor, microcontroller, integrated circuit, or other suitable processing device. Similarly, the memory may include any suitable computer-readable medium or media, including, but not limited to, non-transitory computer-readable media, RAM, ROM, hard drives, flash drives, or other memory devices. The memory may store information accessible by processor(s), including instructions that can be executed by processor(s) and data that can be retrieved, manipulated, created, or stored by processor(s). In several embodiments, the data may be stored in one or more databases.

Similar to the server, the user device may also include one or more processors and associated memory. The processor(s) may be any suitable processing device known in the art, such as a microprocessor, microcontroller, integrated circuit, or other suitable processing device. Similarly, the memory may be any suitable computer-readable medium or media, including, but not limited to, non-transitory computer-readable media, RAM, ROM, hard drives, flash drives, or other memory devices. As is generally understood, the memory may be configured to store various types of information, such as data that may be accessed by the processor(s) and instructions that may be executed by the processor(s). The data may generally correspond to any suitable files or other data that may be retrieved, manipulated, created, or stored by processor(s). In several embodiments, the data may be stored in one or more databases.

An embodiment of the present disclosure also provides for an on-device computer that is capturing data and sending that data to another server where the aggregate database lives. The heavy computing work of processing and analyzing that data, using machine learning to create parameters to fit the predictive model, and then sending a signal can be handled by a server. Predictive analytics with behavioral triggers reduce the compute power required on a device.

Figure 24:
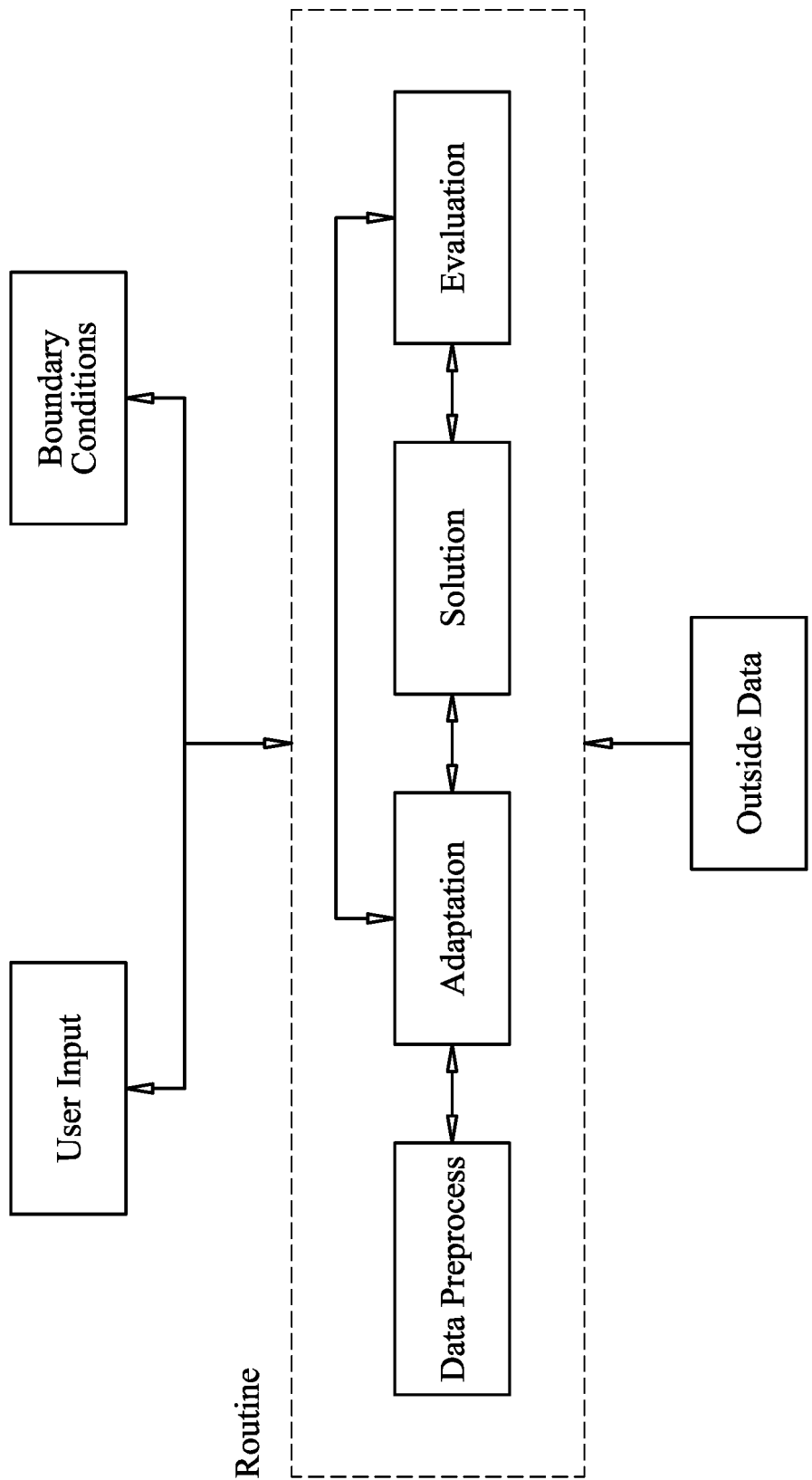
FIG. 24 is a flowchart of a machine learning routine in accordance with an embodiment.

FIG. 24 is a flowchart of an embodiment of a machine learning routine of the present disclosure. In the machine learning routine, dynamic user input data such as brain wave activity, galvanic skin response, heart rate and other biological sources, is fit to preset boundary conditions set based on static outside data such as the aggregate database. These inputs are fed into the machine learning routine to pre-process the data, predict which response would help improve the user's performance, then deliver a solution back to the user. At the end of the routine, the system will evaluate the user success of the routine and log that performance data to improve future performance of the predictive algorithm.

Figure 25:
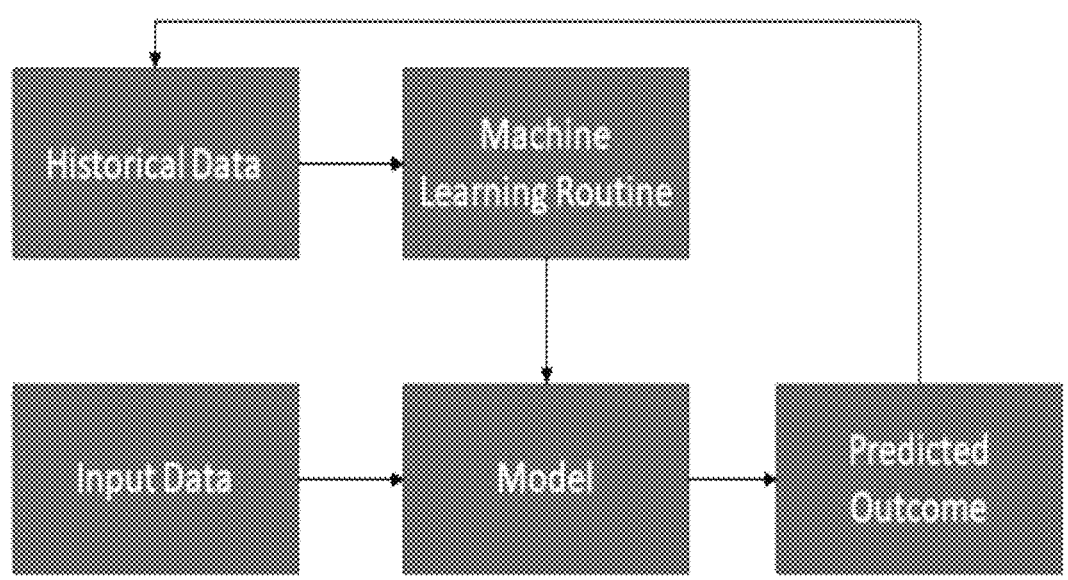
FIG. 25 is a flow chart of a functional model operation in accordance with an embodiment.

FIG. 25 is a flowchart of an embodiment of a functional model operation of the present disclosure. In the functional model operation dynamic user input data is fed into the model, and a predicted outcome is generated based on historical data and boundary conditions are created using the machine learning routine. The output is continually fed back into the model.

Figure 26:
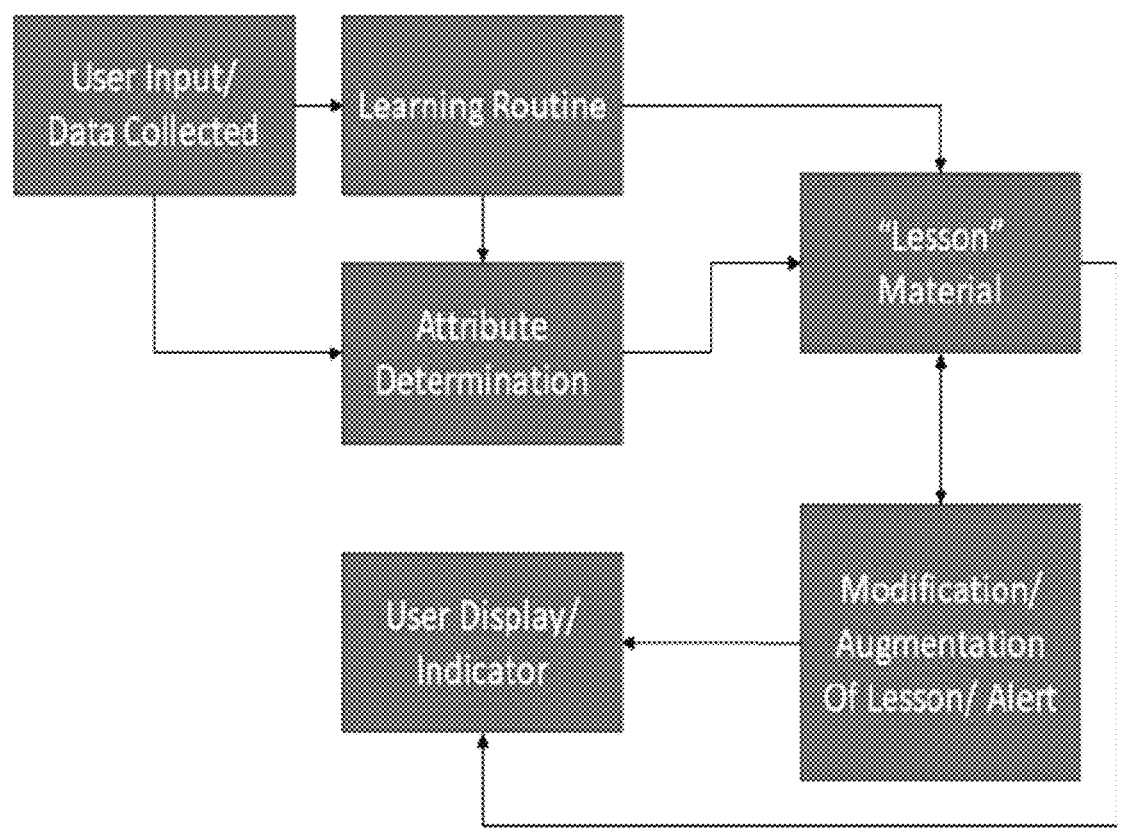
FIG. 26 is a flowchart of a lesson in the loop in accordance with an embodiment.

FIG. 26 is a flowchart of an embodiment of a possible lesson in the loop with the user in accordance with the present disclosure. Data is collected from the user while they execute the learning routine, and analyzed to determine attributes such as cognitive load or emotional engagement. Depending on how the user data performs relative to preset boundary conditions, the lesson material may be modified in some way to improve performance, such as by delivering an alert to the user to stop and take a break.

2. Example 2: Network Connecting People and Headset-Based Brain-Computer Interface An embodiment of the disclosure is directed to a learning system and method that is tailored to an individual user, or a group of users, to provide an effective learning program. The learning system and method of the present invention comprises many possible formulations and combinations of the following that can be used to solve the challenges with standardized approaches to learning and training by helping individuals or groups enter or maintain a mental state that is predicted to have the best learning outcomes, such as improved retention or task performance. The system and method of the present disclosure provide an opportunity to gain even stronger insights about how people are learning in group settings, and how individual performance may be impacted in a group setting, by connecting multiple headsets that act as an interface between the user and the computer they are using to learn.

In one embodiment, the system and method of the present disclosure creates a new learning system by connecting multiple individual data-gathering devices and methods so that they can communicate between themselves. In this setting, individual and group data will be contributed to an aggregate, anonymized database of user performance; predictive models generated using the aggregate database that allow the system to synthesize and translate individual or group data inputs into corresponding recommended actions; user devices; and learning programs, all such components being connected via a network or, alternatively, not on a network depending on the desired application. The learning system of the present invention analyzes and synthesizes user inputs that are gathered from sensors, surveys, observations and other sources to preferably augment, modify, or create a learning environment that is tailored to be most effective for the user at that specific moment in time.

Each time biological data is gathered from an individual completing a learning routine, that data becomes part of an aggregate database. Modeling that data using machine learning can create a system to predict how a user will perform in a certain learning routine. This system would allow for scenarios where the individual data set that is being generated in real time is compared against known trends in the aggregate database in order to enact changes to the learning environment that are predicted to improve that user's performance of the learning routine, such as changes to content style, color or speed. The system also gives commands to the user such as to take a break.

In an embodiment of the learning system of the present disclosure, the determination of effective learning conditions for a user is accomplished by predicting a user's performance along with a comparison to their learning group, based on a comparison against known performance trends identified by the aggregate database. The predictive models that are created and continually refined using the aggregate database allow the system to create a real-time feedback loop that drives learning programs to be modified in the course of an operational routine. For example, consider students working together in a team learning scenario, where tasks and functions are spread throughout a group. While working together, they are wearing a headset that collects brain wave data and feeds it into the database. By analyzing brain wave data, the system can identify if their workload levels spike into a territory that indicates cognitive load, which we recognize as overload or stress, or boredom. By comparing that indicator to the database, the system can instantaneously predict what change should be enacted to reduce the individual user's cognitive load and send a signal back to the learning software to enact a real-time change such as designating a member of the team to take a turn as leader, or providing a simplified version of the same content prior to the individual user completing a quiz of their comprehension of the section.

In one embodiment, a primary use case involves the gathering of qualitative and quantitative user input data before, during or after a learning or training routine. The system is devised so that it can take the processed information from a computational resource and detect user attributes, such as concentration, fatigue, stress, etc. and modifies an existing or custom learning routine in order for the user to obtain improved learning outcomes such as better retention or performance.

In one embodiment, a headset is used to capture user data and then transmit that data using an on-board computer to a networked server that hosts the aggregate database. Multiple individuals may wear headsets, such that the headsets are able to communicate between one another. In addition to facilitating team learning scenarios as described above, the interaction of users wearing headsets could also be used to facilitate team learning through competition, as well as predicting behavior like cheating.

The data that is gathered in real time is fit into a model and the result of that model's output is sent back to the individual user and/or group. This could be in the form of a visual, auditory, physical, or other type of indication, such as a change in content color, a sound indicating it is time to take a break, or changing content from text to drawings for visual learners. The output can also predict performance for the given task. For instance, in a reading comprehension example, the output could determine which areas in the assigned literature were comprehended more than other areas, using timestamped data, image tracking, sensor readings, user inputs or the like to identify those areas. This would be accomplished through factors being determined through the data such as concentration, energy level, and fatigue and then those factors being applied to the model. This model is iterated over time in a continuous or non-continuous fashion. This could be a background or foreground function of the software.

Over time, each instance of making performance predictions based on user inputs and generating associated outputs will improve the system's ability to enhance individuals' and group performance within a given learning routine. Users can input their own data sets to augment the machine learning functions, such as surveys, independent sensor input, and other text entries. Once learning challenges have been identified, the predictive models could be applied to generate an associated feedback in the learning program that is most strongly correlated with success. This could be done with prompts, instructions, automated procedures, or the like. For example, in one case, if inattention is identified in the individual, they could be prompted with a simple instruction to stop and take a 15-minute break before continuing with the learning or training exercise. If one team member is identified to be intimidating to other team members, the identified team member may receive additional training on effectively collaborating in a team setting.

The type of data being gathered include examples such as brain wave data gathered using an EEG headset, self-reported assessments of learning effectiveness and performance indicating mastery of the content taught during learning routines. These inputs are analyzed and then translated into a corresponding output action. In addition, using predictive analytics with behavioral triggers to reduce the compute power needed on that device.

The predictive capability created by fitting the aggregated input data from each individual user into models using machine learning techniques are unique because they identify learning challenges and predict appropriate output responses. These responses are delivered via the devices that interface with the user to create a dynamic feedback loop that improves learning outcomes.

In a preferred embodiment of learning system and method of the present invention, a primary approach to acquire the necessary user information or user inputs comes in the form of a device or a plurality of devices placed on the user's head in order to acquire the electrical activity in the brain. One example of such a device could be an electroencephalogram (EEG).

As shown in FIGS. 11a and 11b, such devices can be assembled into an integrated headset worn during use or, alternatively, be placed directly onto the head without a headset. Additional sources of user inputs can include data gathered from keyboards, touch screens, verbal input, eye tracking, sensor data, or from external observation equipment such as scanners (optical or other) or user questionnaires/surveys.

Referring to FIGS. 12-17, in one embodiment, a headset 100, in this example, is comprised of sensors, electrical and data acquisition/handling system, and power storage electrically coupled together by wires on a headband. In one embodiment, the headset includes power handling/charging, active cooling devices, and cooling inlets/outlets.

FIGS. 13a and 13b show schematic illustrations of the internal components of an embodiment of a headset of the present invention having an on-headset alerting device. This alerting device is intended to communicate with other devices, such as a cloud server for running predictive analytics programs, or directly with the user, or to hold information.

FIGS. 17a and 71b are schematic illustrations of the internal components of an embodiment of a headset of the present invention with sensor blocks attached to the headset in a floating manner.

The sensors are preferably placed in understood point locations around the scalp of a human head and also could include the ears as illustrated in FIGS. 18 and 19. The sensors preferably do not require conductive pastes, liquids, or other medium to collect data. However, it is appreciated that those type of sensors can be used in the system to collect the desired data.

For example, a sensor could be a dry sensor. it can be surrounded by a soft material, such as for example, silicone, fabric, plastic, cotton, other padding material, or rubber, or sensor itself could be made entirely from a soft or flexible material. The sensor can be embedded in material or can be attached to material. The sensor can be partially exposed, such as at the tips, or be entirely covered by material or other covering.

The headset itself enables autonomous calibration so that a routine does not need to be run on the user in order to utilize the data obtained from the user. This can be done through normalization, transforms of the data, or trend algorithms and is backed by the machine learning routine that is created and updated over time. The signal gains from the sensors are adjustable in order to have adequate data quality to be utilized or sent to another device to be utilized. The signal can be utilized without and with filtering such as physical or digital filters. Physical filters could come as a piece of electrical hardware and digital filters could include software, a common example would be a Kalman filter but could be generic or highly customized.

Referring to FIGS. 20-23, in one embodiment, a user will complete a learning routine, either using a computer or another offline learning method, while wearing a headset device that may transmit data to other devices, or to the user, either while wired or wirelessly.

FIG. 20 is an illustrative example of a user wearing a headset interfacing with a computer wherein the headset feeds back into the computer wirelessly. This could also include routines in which data is sent to a cloud server where it is processed and analyzed using machine learning algorithms before sending some modification instruction back to the learning software the user is studying. This data is processed off the headset so that the overall compute power requirements are lowered and allow for a real-time change to be delivered to the user.

FIG. 21 is an illustrative example of a user wearing a headset interfacing with a computer wherein the headset feeds back into the computer over a wire. This could allow for other routines that are locally processed in order to deliver feedback to the user.

FIG. 22 is an illustrative example of a user wearing a headset interfacing with a computer wherein the headset gives direct feedback to a user. For example, the colors used in a learning program could be changed to highlight different sections of content.

FIG. 23 is an illustrative example of a user wearing a headset interfacing with non-connected material such as a book, wherein the headset data feeds back into a computer wirelessly. This data could be used to provide recommendations to the user after they have finished the learning routine, and will be added to the aggregate database to improve the overall accuracy of functional models that are used in the machine learning routines.

The software routine that is run could take many forms. The routine could be run on the same device gathering inputs, a separate device, or a device running other software needed. One conceived permutation involves using the described innovation in order to enhance or augment the learning process. For example, the routine could involve a highly efficient deep neural network model that can predict outcomes based on inputs. This routine can become more accurate over time through machine learning operations that utilize the inputs to become more accurate in the predictions as more data is gathered. The routine can also be stagnant and not change over time. For example, an enterprise may want to train employees safe procedures for working in a facility. The system may be able to identify that based upon the speed with which a user completes the questions, they are not actually spending enough time to absorb the information. The system may then be prompted to provide more difficult testing questions that require critical reasoning, rather simple questions that would only require a rote memorization of the content being presented.

The routines could utilize standard or quantum-based computing. Data for the machine learning operations can be gathered from sensors like the described headset or be given directly through a file upload or some similar operation.

For example, a server may include a processor(s) and a memory. The processor(s) may be any suitable processing device, such as a microprocessor, microcontroller, integrated circuit, or other suitable processing device. Similarly, the memory may include any suitable computer-readable medium or media, including, but not limited to, non-transitory computer-readable media, RAM, ROM, hard drives, flash drives, or other memory devices. The memory may store information accessible by processor(s), including instructions that can be executed by processor(s) and data that can be retrieved, manipulated, created, or stored by processor(s). In several embodiments, the data may be stored in one or more databases.

Similar to the server, the user device may also include one or more processors and associated memory. The processor(s) may be any suitable processing device known in the art, such as a microprocessor, microcontroller, integrated circuit, or other suitable processing device. Similarly, the memory may be any suitable computer-readable medium or media, including, but not limited to, non-transitory computer-readable media, RAM, ROM, hard drives, flash drives, or other memory devices. As is generally understood, the memory may be configured to store various types of information, such as data that may be accessed by the processor(s) and instructions that may be executed by the processor(s). The data may generally correspond to any suitable files or other data that may be retrieved, manipulated, created, or stored by processor(s). In several embodiments, the data may be stored in one or more databases.

An embodiment of the present invention also provides for an on-device computer that is capturing data and sending that data to another server where the aggregate database lives. The heavy computing work of processing and analyzing that data, using machine learning to create parameters to fit the predictive model, and then sending a signal can be handled by a server. Predictive analytics with behavioral triggers reduce the compute power required on a device.

Figure 28:
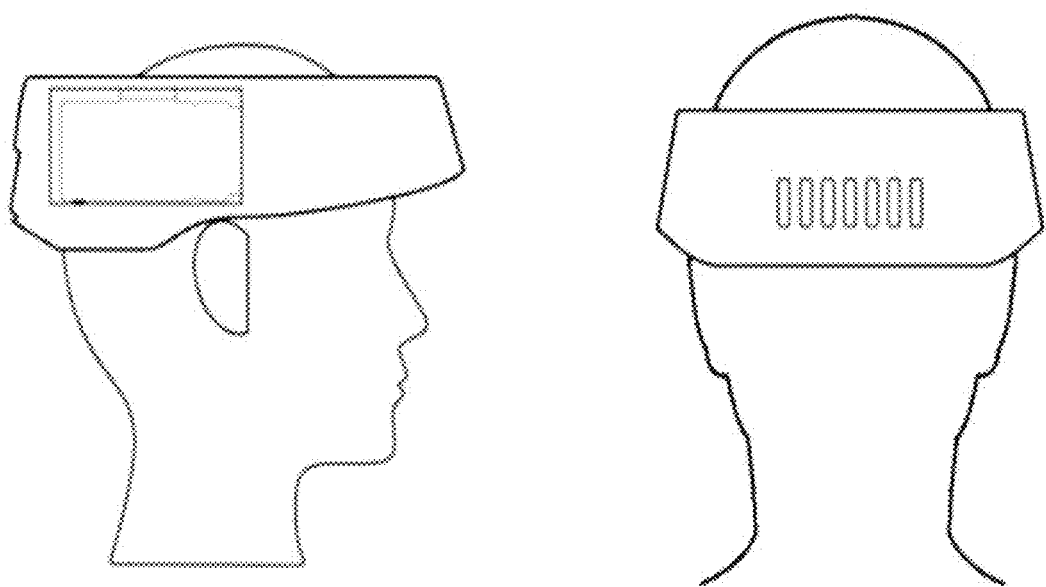
FIG. 28 illustrates an EEG headset with an on-board computer for data processing in accordance with an embodiment.
Figure 29:
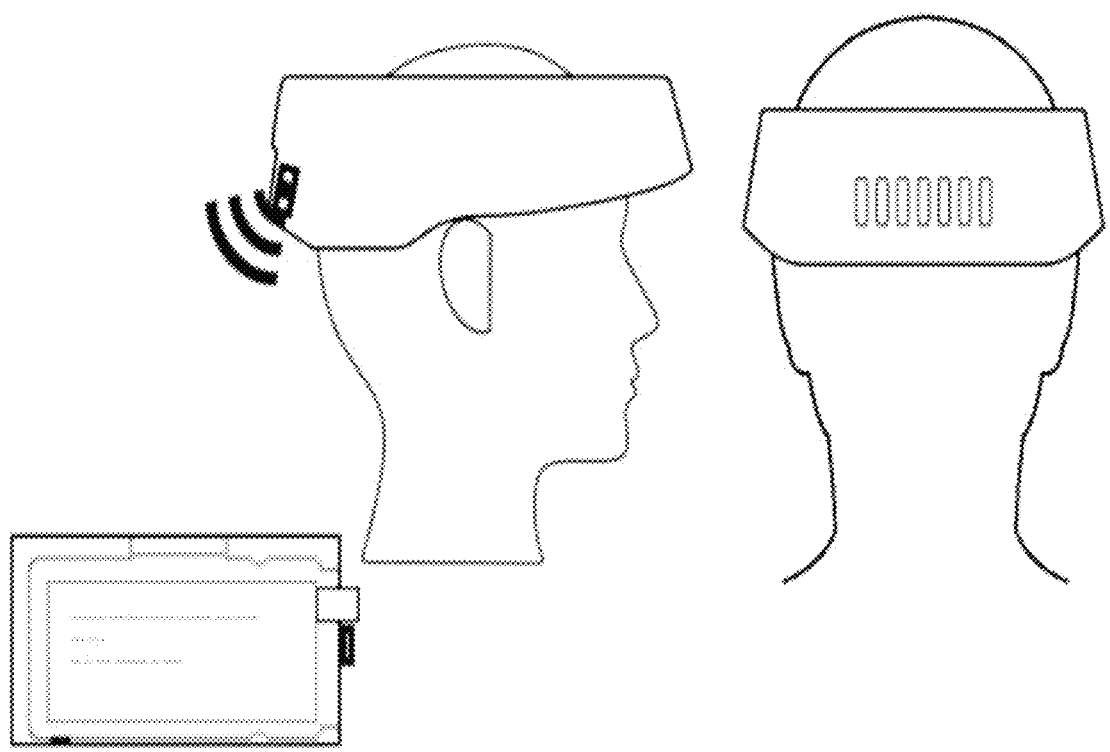
FIG. 29 illustrates an EEG headset with an external computer for data processing in accordance with an embodiment.
Figure 30:
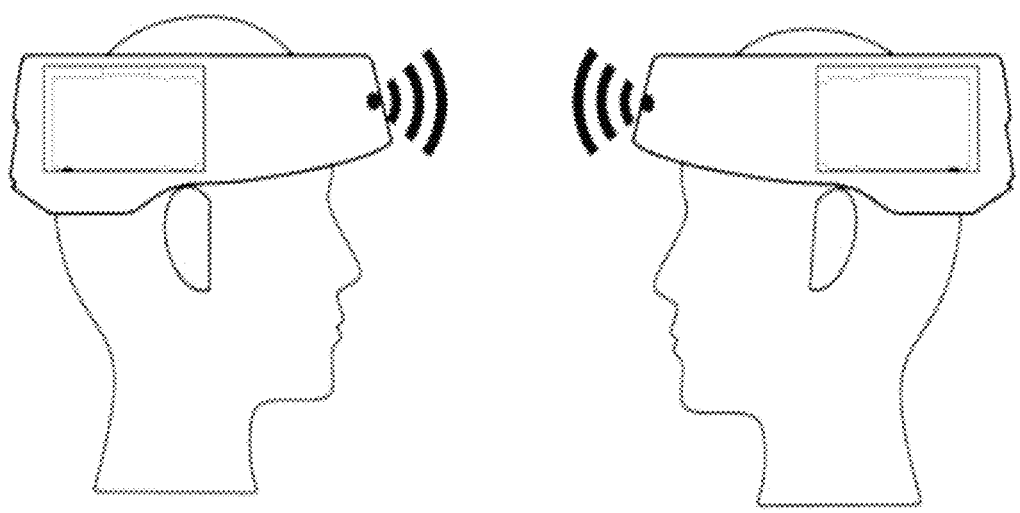
FIG. 30 illustrates communication between EEG headsets of different user in accordance with an embodiment.
Figure 31:
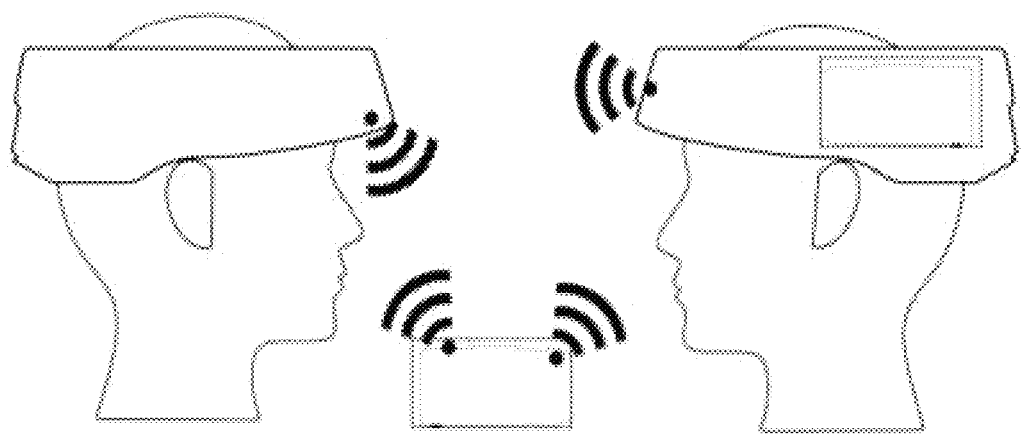
FIG. 31 illustrates communication between individual EEG headsets an d other devices in a system in accordance with an embodiment.
Figure 32:
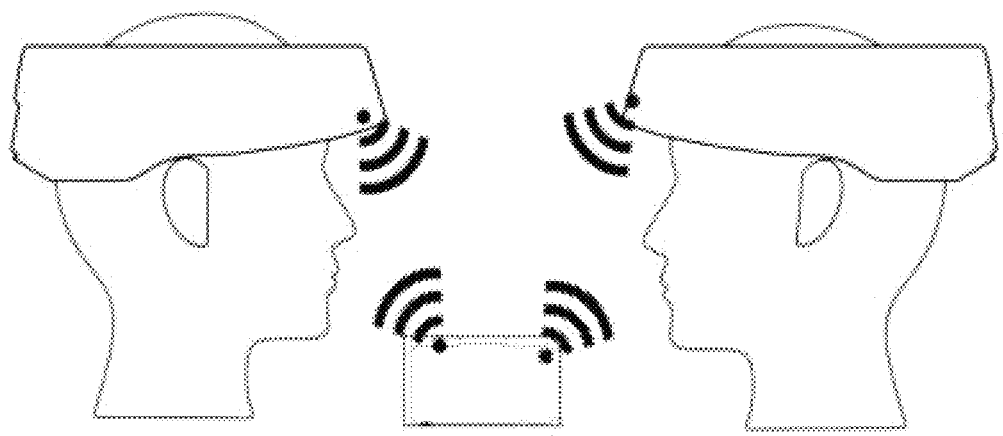
FIG. 32 illustrates communication between individual EEG headsets an d other devices in a system in accordance with an embodiment
Figure 33:
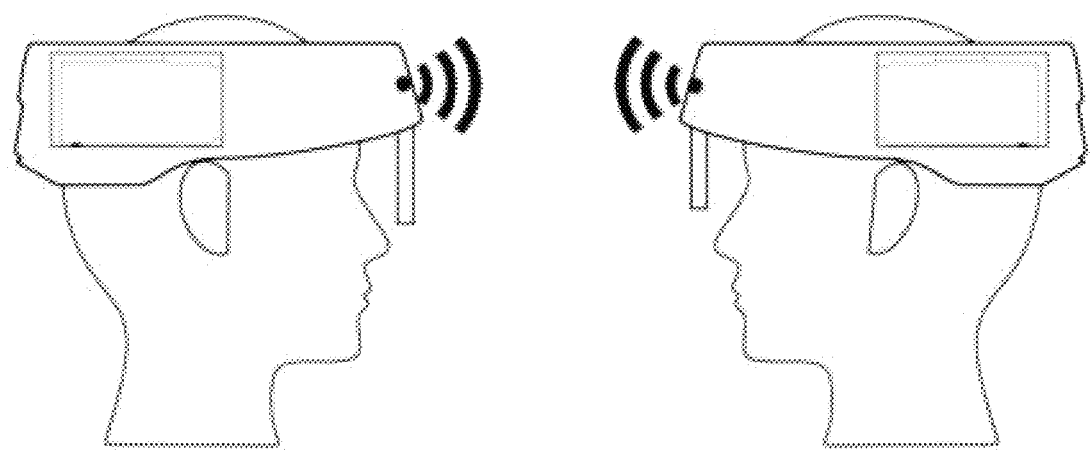
FIG. 33 illustrates generation of direct visual output based on a predictive engine in accordance with an embodiment.
Figure 34:
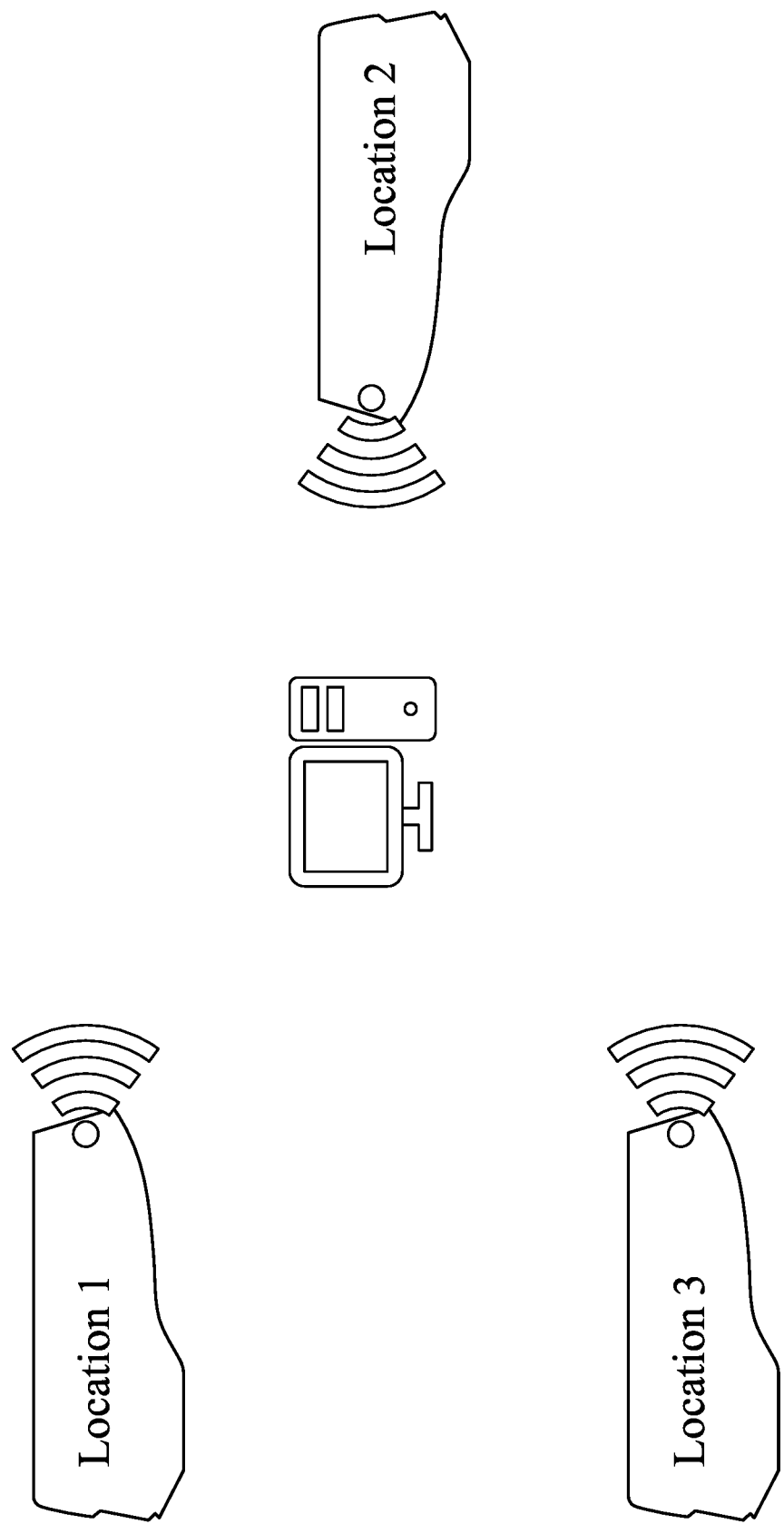
FIG. 34 illustrates an example of how data from multiple headsets is communicated back to a server in accordance with an embodiment.

FIGS. 28 and 29 show embodiments of the headset of the present invention that can process data on the headset itself using an on-board computer, or conversely, by wirelessly transmitting that data to an external server for analysis and execution of the learning system scheme.

In an embodiment, the computer is on board the headset directly. The on-board computer can be made to be removable or permanently attached. The computer will have storage and processing capabilities, as well as wireless communication to facilitate the heaviest computing work at a networked location. Machine learning routines established at a networked location can run on the computer for direct improvement of the learning environment (lesson) and can be used to interpret the user's unique signatures for a given stimulus (aide for self-calibration).

The computer can be detached and signals can go between the headset and the computer, vice versa, or two-way communication between the two.

FIGS. 30 through 34 show examples of various possible scenarios to share information among multiple headsets being worn by individual users, and with the central server location where data is processed and machine learning schemes executed. This arrangement would support team learning activities as described, and will allow for the predictive algorithms to function during the course of a lesson between participants. The computer can be on-board the headset or operate independently, and communicate with the lesson material to alter the experience in a way that has been predicted to improve learning outcomes.

The headsets are able to communicate between themselves using on-board computers with wireless communication abilities, as well as with networked computers. This can support a facilitated team-learning scenario where group members each have different and dependent responsibilities. It can also be used to predict attitudes and behaviors such as cohesion, or cheating. Machine learning can be used to make predictive recommendations to improve learning outcomes based on the individual and group responses assessed during a group lesson. This may be experienced by the student when they are using a computer that is networked with the headset, and a recommendation triggers a change in the software they are using to access a learning program.

The addition of direct visual output can be added to the headsets to allow communicated information to be shared between users, such as a light or color to indicate stress or excitement.

Headsets or computers connected to headsets can transmit data back to a central location for compiling or learning scheme execution. This central location will update the models and modify learning execution scenarios. The central location can be one or many networked locations. Similarly, the network can be disaggregated into the headsets themselves. Back and forth communication is optional for each scenario described. The headsets do not have to be in a single location to benefit from the collective data gathering. Conversely, headsets can be limited to a single location for more customized applications.

Predictive Model-Based System for Lower On-Device Compute Power

In one embodiment, the learning system and method comprises a computing system that includes a wearable device such as a headset with an integrated on-board computer and wireless communication system, and a predictive model engine that can execute complex problems on a networked cloud server, and a feedback loop to the user headset and learning device.

In one embodiment, the learning system and method may include gathering user data from the individual's headset, wirelessly transmitting that data to an external server for analysis, running predictive models based on that data and delivering a response back to the headset in order to trigger a response. In the preferred embodiment, this directive would be predicted to improve learning outcomes based on machine learning routines built using the behavioral database and realized within the learning environment. Processing this data off the headset allows the entire routine to be run in real-time for the user, while enabling minimum power requirements on the user headset.

It is appreciated that an embodiment could also be used for other applications such as enabling other wearable devices and sensors that gather biological data to similarly conduct heavy computing work in the cloud, while minimizing the size and computing requirements for the wearable device.

The learning system and method may be tailored to an individual user, or a group of users, to provide an effective learning program. The learning system and method comprise many possible formulations and combinations of the following that can be used to solve the challenges with standardized approaches to learning and training by helping individuals or groups enter or maintain a mental state that is predicted to have the best learning outcomes, such as improved retention or task performance.

For example, the learning system and method in one embodiment includes: individual data-gathering devices and methods; an aggregate, anonymized database of user performance; predictive models generated using the aggregate database that allow the system to synthesize and translate individual data inputs into corresponding recommended actions; user devices; and learning programs, all such components being connected via a network or alternatively, not on a network depending on the desired application. The predictive model-based system of the present invention allows data-gathering devices such as an electroencephalogram (EEG) for example, or other types of wearable devices to analyze and synthesize user inputs in real-time, while maintaining comfort and usability of such devices. In the preferred embodiment, this real-time signal would be used preferably to augment, modify, or create a learning environment that is predicted to be most effective for the user at that specific moment in time.

Each time data is gathered from an individual using the learning system, in this example gathering biological data to complete a learning routine, that data becomes part of an aggregate database, which becomes the foundational dataset for the predictive algorithms. Modeling that data using machine learning can create a system to predict how a user will perform in a certain learning routine. This predictive system would allow for scenarios where the individual data set that is being generated in real time is compared against known trends in the aggregate database in order to enact changes to the learning environment that are predicted to improve that user's performance of the learning routine, such as changes to content style, color or speed. These complex problems are best suited to processing by a remote processor such as an external server and off the on-board computer of a user device to allow for lightweight hardware that can still deliver high-powered predictive recommendations.

In one embodiment of the learning system, the determination of effective learning conditions for a user is accomplished by predicting a user's performance, based on a comparison against known performance trends identified by the aggregate database. The predictive models that are created and continually refined using the aggregate database allow the system to create a real-time feedback loop that drives learning programs to be modified in the course of an operational routine. For example, consider students taking a reading comprehension test. While taking the test, they are wearing a headset that collects brain wave data and feeds it into the database. By analyzing brain wave data, the system can identify if their workload levels spike into a territory that indicates cognitive load, which we recognize as overload or stress, or boredom. By comparing that indicator to the database, the system can instantaneously predict what change should be enacted to reduce the individual user's cognitive load and send a signal back to the learning software to enact a real-time change such as providing a simplified version of the same content prior to the user completing a quiz of their comprehension of the section. Over time the aggregate database can be used to create learner profiles, and by matching individual users to those profiles there are additional opportunities for tailored learning exercises based on what the system knows about that profile's typical performance.

In one embodiment, a headset is used to capture user data and then transmit that data using an on-board computer to a networked server that hosts the aggregate database. This allows the system to conduct most of the heavy computing work in the cloud instead of on the headset, as well as run predictive algorithms based on the aggregate database with a computing power great enough to deliver a real-time signal back to the user's device, which commands a change in the learning program in order to make that program more effective.

The primary use case involves the gathering of qualitative and quantitative user input data before, during or after a learning or training routine. The system is devised that it can take the processed information from a computational resource, send that data to a networked server and run machine learning routines to predict likely user behavior based on user attributes, such as concentration, fatigue, stress, etc.

The data that is gathered in real time is fit into a model and the result of that model's output is sent back to the user. When used as part of the learning system, this signal to the user could be in the form of a visual, auditory, physical, or other type of indication, such as a change in content color, a sound indicating it is time to take a break, or changing content from text to drawings for visual learners. The output can also predict performance for the given task. For instance, in a reading comprehension example, the output could determine which areas in the assigned literature were comprehended more than other areas, using timestamped data, image tracking, sensor readings, user inputs or the like to identify those areas. This would be accomplished through factors being determined through the data such as concentration, energy level, and fatigue and then those factors being applied to the model. This model is iterated over time in a continuous or non-continuous fashion. This could be a background or foreground function of the software.

Over time, each instance of making performance predictions based on user inputs and generating associated outputs will improve the system's ability to apply predictive models and generate an associated feedback in the learning program that is most strongly correlated with success. This could be done with prompts, instructions, automated procedures, or the like. For example, in one case, if inattention is identified in the individual, they could be prompted with a simple instruction to stop and take a 15-minute break before continuing with the learning or training exercise.

The type of data being gathered include examples such as brain wave data gathered using an EEG headset, or other biological data gathered using wearable devices. These inputs are analyzed and then translated into a corresponding output action. Using predictive analytics based on these behavioral triggers will reduce the compute power needed on that device.

The predictive capability created by fitting the aggregated input data from each individual user into models using machine learning techniques are unique because they identify learning challenges and predict appropriate output responses. These responses are delivered via the devices that interface with the user to create a dynamic feedback loop that improves learning outcomes.

These and other objects of the present invention will be apparent from review of the following specification and the accompanying drawings.

In a preferred embodiment of learning system and method of the present invention, a primary approach to acquire the necessary user information or user inputs comes in the form of a device or a plurality of devices placed on the user's head in order to acquire the electrical activity in the brain. One example of such a device could be an electroencephalogram (EEG).

As shown in FIGS. 11a and 11b, such devices can be assembled into an integrated headset worn during use or, alternatively, be placed directly onto the head without a headset. Additional sources of user inputs can include data gathered from keyboards, touch screens, verbal input, eye tracking, sensor data, or from external observation equipment such as scanners (optical or other) or user questionnaires/surveys.

Referring to FIGS. 12, 17, 18, 19, 20, 21 in one embodiment, a headset, in this example, is comprised of sensors, an electrical and data acquisition/handling system, and power storage electrically coupled together by wires on a headband. In one embodiment, headset includes power handling/charging active cooling devices, and cooling inlets/outlets.

FIGS. 12a and 12b show schematic illustrations of the internal components of an embodiment of headset of the present invention having an on-headset alerting device. This alerting device is intended to communicate with other devices, such as a cloud server for running predictive analytics programs, or directly with the user, or to hold information.

FIGS. 17a and 17b are schematic illustrations of the internal components of an embodiment of a headset of the present invention with sensor blocks attached to a headset in a floating manner.

The headset itself enables autonomous calibration so that a routine does not need to be run on the user in order to utilize the data obtained from the user. This can be done through normalization, transforms of the data, or trend algorithms and is backed by the machine learning routine that is created and updated over time. The signal gains from the sensors are adjustable in order to have adequate data quality to be utilized or sent to another device to be utilized. The signal can be utilized without and with filtering such as physical or digital filters. Physical filters could come as a piece of electrical hardware and digital filters could include software, a common example would be a Kalman filter but could be generic or highly customized.

Referring to FIGS. 20, 21, 22, and 23, in an embodiment, a user will complete a learning routine, either using a computer or another offline learning method, while wearing a headset device that may transmit data to other devices, or to the user, either while wired or wirelessly.

FIG. 20 is an illustrative example of a user wearing a headset interfacing with a computer wherein the headset feeds back into the computer wirelessly. This could also include routines in which data is sent to a cloud server where it is processed and analyzed using machine learning algorithms before sending some modification instruction back to the learning software the user is studying. This data is processed off the headset so that the overall compute power requirements are lowered and allow for a real-time change to be delivered to the user.

FIG. 21 is an illustrative example of a user wearing a headset interfacing with a computer wherein the headset feeds back into the computer over a wire. This could allow for other routines that are locally processed in order to deliver feedback to the user.

FIG. 22 is an illustrative example of a user wearing a headset interfacing with a computer wherein the headset gives direct feedback to a user. For example, the colors used in a learning program could be changed to highlight different sections of content.

FIG. 23 is an illustrative example of a user wearing a headset interfacing with non-connected material such as a book, wherein the headset data feeds back into a computer wirelessly. This data could be used to provide recommendations to the user after they have finished the learning routine, and will be added to the aggregate database to improve the overall accuracy of functional models that are used in the machine learning routines.

The software routine that is run could take many forms. The routine could be run on the same device gathering inputs, a separate device, or a device running other software needed. One conceived permutation involves using the described innovation in order to enhance or augment the learning process. For example, the routine could involve a highly efficient deep neural network model that can predict outcomes based on inputs. This routine can become more accurate over time through machine learning operations that utilize the inputs to become more accurate in the predictions as more data is gathered. The routine can also be stagnant and not change over time. For example, an enterprise may want to train employees safe procedures for working in a facility. The system may be able to identify that based upon the speed with which a user completes the questions, they are not actually spending enough time to absorb the information. The system may then be prompted to provide more difficult testing questions that require critical reasoning, rather than simple questions that would only require a rote memorization of the content being presented.

The routines could utilize standard or quantum-based computing. Data for the machine learning operations can be gathered from sensors like the described headset or be given directly through a file upload or some similar operation.

For example, a server may include a processor(s) and a memory. The processor(s) may be any suitable processing device, such as a microprocessor, microcontroller, integrated circuit, or other suitable processing device. Similarly, the memory may include any suitable computer-readable medium or media, including, but not limited to, non-transitory computer-readable media, RAM, ROM, hard drives, flash drives, or other memory devices. The memory may store information accessible by processor(s), including instructions that can be executed by processor(s) and data that can be retrieved, manipulated, created, or stored by processor(s). In several embodiments, the data may be stored in one or more databases.

Similar to the server, the user device may also include one or more processors and associated memory. The processor(s) may be any suitable processing device known in the art, such as a microprocessor, microcontroller, integrated circuit, or other suitable processing device. Similarly, the memory may be any suitable computer-readable medium or media, including, but not limited to, non-transitory computer-readable media, RAM, ROM, hard drives, flash drives, or other memory devices. As is generally understood, the memory may be configured to store various types of information, such as data that may be accessed by the processor(s) and instructions that may be executed by the processor(s). The data may generally correspond to any suitable files or other data that may be retrieved, manipulated, created, or stored by processor(s). In several embodiments, the data may be stored in one or more databases.

In one embodiment, the system also provides for an on-device computer that is capturing data and sending that data to another server where the aggregate database lives. The heavy computing work of processing and analyzing that data, using machine learning to create parameters to fit the predictive model, and then sending a signal can be handled by a server. Predictive analytics with behavioral triggers reduce the compute power required on a device.

FIG. 24 is a flowchart of an embodiment of a machine learning routine. In the machine learning routine, dynamic user input data such as brain wave activity, galvanic skin response, heart rate and other biological sources, is fit to preset boundary conditions set based on static outside data such as the aggregate database. These inputs are fed into the machine learning routine to pre-process the data, predict which response would help improve the user's performance, then deliver a solution back to the user. At the end of the routine, the system will evaluate the user success of the routine and log that performance data to improve future performance of the predictive algorithm.

FIG. 25 is a flowchart of an embodiment of a functional model operation of the present invention. In the functional model operation dynamic user input data is fed into the model, and a predicted outcome is generated based on historical data and boundary conditions are created using the machine learning routine. The output is continually fed back into the model.

FIG. 26 is a flowchart of an embodiment of a possible lesson in the loop with the user in accordance with the present invention. Data is collected from the user while they execute the learning routine, and analyzed to determine attributes such as cognitive load or emotional engagement. Depending on how the user data performs relative to preset boundary conditions, the lesson material may be modified in some way to improve performance, such as by delivering an alert to the user to stop and take a break.

Some additional examples will now be described:

Example 1

A computer-implemented method comprising:
monitoring biometric data of a user during a virtual reality or augmented reality educational training session, the biometric data including electroencephalogram (EEG) data;
classifying the biometric data into at least one metric of at least one cognitive mental state associated with a learning efficacy; and
adapting the virtual reality or augmented reality training session based on values of the at least one metric, with the adapting being selected on a learning performance prediction based on the at least one cognitive mental state metric.

Example 2

The computer implemented method of Example 1, wherein the biometric data further comprises at least one of a heart rate, eye tracking data, and motion tracking data.

Example 3

The computer implemented method of Example 1, wherein the at least one metric comprises a cognitive load.

Example 4

The computer implemented method of Example 1, wherein the at least one metric further comprises at least one of an anxiety level, a motivation level, a focus level, and an attention level.

Example 5

The computer implemented method of Example 1, wherein the adapting is triggered based on at least one threshold value of the at least one metric.

Example 6

The computer implemented method of Example 2, further comprising calibrating thresholds of the at least one metric for the user in a test phase.

Example 7

The computer implemented method of Example 1, wherein the test phase comprises monitoring the biometric data during the test phase in response to training material presented via the virtual reality or augmented reality.

Example 8

The computer implemented method of Example 1, wherein the adapting is selected to maintain the at least one cognitive mental state within a selected range of values.

Example 9

The computer implemented method of Example 1, further comprising utilizing a trained machine learning model to perform the classifying and the adapting.

Example 10

The computer implemented method of Example 1, wherein the adapting comprises at least one of adapting a complexity of the learning session, adapting a pace of the learning session, and incorporating rest periods in the learning session.

Example 11

A system comprising:
a biometric data monitor to monitor biometric data of a user during a virtual reality or augmented reality training session, the biometric data including electroencephalogram (EEG) data;

a classifier to classify the biometric data into at least one metric of at least one cognitive mental state associated with a learning efficacy; and a content server to serve content to a virtual reality or augmented reality system, the content server adapting the content of a training session based on values of the at least one metric, with the adapting being selected on a learning performance prediction based on the at least one cognitive mental state metric.

Example 12

The system of Example 11, wherein the biometric data further comprises at least one of a heart rate, eye tracking data, and motion tracking data.

Example 13

The system of Example 11, wherein the at least one metric comprises a cognitive load.

Example 14

The system of Example 11, wherein the at least one metric further comprises at least one of an anxiety level, a motivation level, a focus level, and an attention level.

Example 15

The system of Example 11, wherein the adapting is triggered based on at least one threshold of the at least one metric.

Example 16

The system of Example 11, further comprising calibrating thresholds of the at least one metric for the user in a test phase.

Example 17

The system of Example 11, wherein the test phase comprises monitoring the biometric data during the test phase in response to training material presented via the virtual reality or augmented reality.

Example 18

The system of Example 11, wherein the adapting is selected to maintain the at least one cognitive mental state within a selected range of values.

Example 19

The system of Example 11, further comprising utilizing a trained machine learning model to perform the classifying and the adapting.

Example 20

The system of Example 11, wherein the adapting comprises at least one of adapting a complexity of the learning session, adapting a pace of the learning session, and incorporating rest periods in the learning session Example 21

A computer-implemented method comprising:
storing content for a plurality of variations of a virtual reality or augmented reality training session, the variations including a least one of a training complexity and a training pace;
serving content, associated with the training session, to virtual reality or augmented reality client device;
adapting the flow of served content based on a metric of at least one cognitive mental state of a user of the client device that is based on biometric data of the user, where the at least one cognitive mental state is associated with a learning efficacy; and
the adapting being predictively selected to maintain the virtual reality session within a selected range of the at least one metric.

Example 22

The computer implemented method of Example 21, wherein the biometric data further comprises at least one of a heart rate, eye tracking data, and motion tracking data.

Example 23

The computer implemented method of Example 21, wherein the at least one metric comprises a cognitive load.

Example 24

The computer implemented method of Example 21, wherein the at least one metric further comprises at least one of an anxiety level, a motivation level, a focus level, and an attention level.

Example 25

The computer implemented method of Example 21, wherein the adapting is triggered based on at least one threshold of the at least one metric.

Example 26

The computer implemented method of Example 21, further comprising generating calibrating thresholds of the at least one metric for the user in a test phase.

Example 27

The computer implemented method of Example 21, wherein the test phase comprises monitoring the biometric data during the test phase in response to training material presented via the virtual reality or augmented reality.

Example 28

The computer implemented method of Example 21, wherein the training material is presented in a virtual reality session or an augmented reality session.

Example 29

The computer implemented method of Example 21, further comprising utilizing a trained machine learning model to perform the classifying and the adapting.

Example 30

The computer implemented method of Example 21, wherein the adapting comprises at least one of adapting a complexity of the learning session, adapting a pace of the learning session, and incorporating rest periods in the learning session.

Example 31

A system comprising:
- a data storage unit storing content for a plurality of variations of a virtual reality or augmented reality training session, the variations including a least one of a training complexity and a training pace;
- a content server to server content, associated with the training session, to virtual reality or augmented reality client device;
- the content server adapting the flow of served content based on a metric of at least one cognitive mental state of a user of the client device that is based on biometric data of the user, where the at least one cognitive mental state is associated with a learning efficacy; and
- the adapting being predictively selected to maintain the virtual reality session within a selected range of the at least one metric.

Example 32

The system of Example 31, wherein the content server includes a classifier to classify the biometric data into the at least one metric of at least one cognitive mental state associated with a learning efficacy.

Example 33

The system of Example 32, wherein the content server comprises a machine learning model trained to predictively adapt the flow of content.

Example 34

The system of Example 31, wherein the biometric data further comprises at least one of a heart rate, eye tracking data, and motion tracking data.

Example 35

The system of Example 31, wherein the at least one metric comprises a cognitive load.

Example 36

The system of Example 31, wherein the at least one metric further comprises at least one of an anxiety level, a motivation level, a focus level, and an attention level.

Example 37

The system of Example 31, wherein the adapting is triggered based on at least one threshold of the at least one metric.

Example 38

The system of Example 31, further comprising calibrating thresholds of the at least one metric for the user in a test phase.

Example 39

The system of Example 31, wherein the test phase comprises monitoring the biometric data during the test phase in response to training material presented via the virtual reality or augmented reality.

Example 40

The system of Example 31, wherein the training material is presented in a virtual reality session or an augmented reality session.

Example 41

The system of Example 31, wherein the adapting comprises at least one of adapting a complexity of the learning session, adapting a pace of the learning session, and incorporating rest periods in the learning session

Example 42

A computer-implemented method of neuroadaptive virtual reality training comprising:
- monitoring a plurality of different types of biometric data of a user during a virtual reality or augmented reality training session;
- generating, from a first type of biometric including electroencephalogram (EEG) biometric data, a first metric of a first cognitive mental attribute of the user associated with a learning efficacy; and
- generating, from a second type of biometric data, a second metric of a second cognitive mental attribute of the user associated with a learning efficiency;
- utilizing the first metric and the second metric as feedback regarding an overall cognitive state of the user in the training session; and
- adapting the virtual reality or augmented reality training session based on the feedback.

Example 43

The computer implemented method of Example 42, wherein the second type of biometric data comprises at least one of a heart rate, eye tracking data, and motion tracking data.

Example 44

The computer implemented method of Example 42, wherein the first metric comprises a cognitive load.

Example 45

The computer implemented method of Example 42, wherein the second metric comprises at least one of an anxiety level, a motivation level, a focus level, and an attention level.

Example 46

The computer implemented method of Example 42, wherein the adapting is triggered based on at least one threshold of the first metric and the second metric.

Example 47

The computer implemented method of Example 42, further comprising calibrating thresholds of the at least one metric for the user in a test phase.

Example 48

The computer implemented method of Example 42, wherein the test phase comprises monitoring the biometric data during the test phase in response to training material presented via the virtual reality or augmented reality.

Example 49

The computer implemented method of Example 42, wherein the training material is presented in a virtual reality session or an augmented reality session.

Example 50

The computer implemented method of Example 42, further comprising utilizing a trained machine learning model to perform the classifying and the adapting.

Example 51

The computer implemented method of Example 42, wherein the adapting comprises at least one of adapting a complexity of the learning session, adapting a pace of the learning session, and incorporating rest periods in the learning session.

Example 52

A system comprising:
a biometric data monitor to monitor biometric data of a user during a virtual reality or augmented reality training session, the biometric data including electroencephalogram (EEG) data and at least one other type of biometric data;
a biometric data analyzer to generate a first type of cognitive mental state metric associated with a learning efficacy from the EEG data, and generate a second type of cognitive mental state metric from a second type of biometric data, wherein the second type of cognitive mental state metric is associated with a learning efficacy; and
a predictive engine utilizing the first metric and the second metric to issue commands to adapt adapting the content of a training session.

Example 53

The system of Example 52, wherein the biometric data further comprises at least one of a heart rate, eye tracking data, and motion tracking data.

Example 54

The system of Example 52, wherein the at least one metric comprises a cognitive load.

Example 55

The system of Example 52, wherein the at least one metric further comprises at least one of an anxiety level, a motivation level, a focus level, and an attention level.

Example 56

The system of Example 52, wherein the adapting is triggered based on at least one threshold of the at least one metric.

Example 57

The system of Example 52, further comprising calibrating thresholds of the at least one metric for the user in a test phase.

Example 58

The system of Example 52, wherein the test phase comprises monitoring the biometric data during the test phase in response to training material presented via the virtual reality or augmented reality.

Example 59

The system of Example 52, wherein the training material is presented in a virtual reality session or an augmented reality session.

Example 60

The system of Example 52, further comprising utilizing a trained machine learning model to perform the classifying and the adapting.

Example 61

The system of Example 52, wherein the adapting comprises at least one of adapting a complexity of the learning session, adapting a pace of the learning session, and incorporating rest periods in the learning session Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the broad scope of the claims.

Other embodiments of the invention will be apparent to those skilled in the art from consideration of the specification and practice of the invention disclosed herein. It is intended that the specification and examples be considered as exemplary only, with a true scope and spirit of the invention being indicated by the claims.

Reference in the specification to "one embodiment", "some embodiments" or "an embodiment" means that a particular feature, structure, or characteristic described in connection with the embodiment is included in at least some embodiments of the disclosed technologies. The appearances of the phrase "in some embodiments" in various places in the specification are not necessarily all referring to the same embodiment.

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers, or the like.

These and similar terms can be associated with the appropriate physical quantities and can be considered labels applied to these quantities. Unless specifically stated otherwise as apparent from the prior discussion, it is appreciated that throughout the description, discussions utilizing terms, for example "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer.

The disclosed technologies can take the form of an entirely hardware implementation, an entirely software implementation or an implementation containing both software and hardware elements. In some implementations, the technology is implemented in software, which includes but is not limited to firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A computer-implemented method comprising:
monitoring real-time biometric data of a user during an educational session, the biometric data including electroencephalogram (EEG) data;
generating from the real-time biometric data at least one cognitive mental state metric associated with a learning efficacy; and
performing predictive adaption of education materials of the educational session based on values of the at least one cognitive mental state metric to generate commands to proactively adapt the education materials selected for presentation to the user on a user display device, the commands being selected to maintain the at least one cognitive mental state metric within a desired range to maintain learning efficiency.

2. The computer-implemented method of claim 1, wherein the real-time biometric data further comprises at least one of a heart rate, eye tracking data, and motion tracking data.

3. The computer-implemented method of claim 1, wherein the at least one cognitive mental state metric comprises a cognitive load.

4. The computer-implemented method of claim 3, wherein the at least one cognitive mental state metric further comprises at least one of an anxiety level, a motivation level, a focus level, and an attention level.

5. The computer-implemented method of claim 1, wherein the adapting is triggered based on at least one threshold value of the at least one cognitive mental state metric.

6. The computer-implemented method of claim 1, wherein the generating at least one cognitive state metric comprises using a classifier to classify the real-time biometric data into the at least one cognitive state metric.

7. The computer-implemented method of claim 1, wherein the performing predictive adaption comprises utilizing a machine learning model trained to proactively adapt the education materials to maintain the at least one cognitive mental state metric within a desired range to maintain learning efficiency.

8. The computer-implemented method of claim 1, wherein the adapting is selected to maintain the at least one cognitive mental state within a selected range of values.

9. The computer-implemented method of claim 1, further comprising utilizing a trained machine learning model to maintain the at least one cognitive mental state metric within a desired range and prevent the development of a cognitive mental state deleterious to learning.

10. The computer-implemented method of claim 1, wherein the adapting comprises at least one of adapting a complexity of the learning session, adapting a pace of the learning session, and incorporating rest periods in the learning session.

11. The computer-implemented method of claim 1, wherein the user display device comprises a wearable device.

12. The computer-implemented method of claim 11, wherein the user display device comprises a headset.

13. The computer-implemented method of claim 11, wherein the wearable device is an augmented reality headset or a virtual reality headset.

14. The computer-implemented method of claim 11, where user display device is laptop computer or a tablet device.

15. The computer-implemented method of claim 1, wherein the user display device is a non-wearable device.

16. A computer-implemented method comprising:
monitoring real-time biometric data of a user during an educational session, the biometric data including electroencephalogram (EEG) data;
generating from the real-time biometric data at least one cognitive mental state metric associated with a learning efficacy; and
performing predictive adaption of education materials presented on a user display device based on values of the at least one cognitive mental state metric to proactively adapt the education materials to maintain the at least one cognitive mental state metric within a desired range to maintain learning efficiency and prevent the development of a deleterious mental state for learning.

17. A system comprising:
a biometric data monitor to monitor real-time biometric data of a user during an educational session, the biometric data including electroencephalogram (EEG) data;
a predictive engine to classify the biometric data into at least one metric of at least one cognitive mental state associated with a learning efficacy and generate commands to proactively adapt education materials to maintain the at least one cognitive mental state metric within a desired range to maintain learning efficiency; and
a content server to serve content to a user computing device having a display, the content server receiving the commands generated by the predictive engine and in response adapting the education materials to be presented to the user during the educational session.

18. The system of claim 17, wherein the real-time biometric data further comprises at least one of a heart rate, eye tracking data, and motion tracking data.

19. The system of claim 17, wherein the at least one cognitive mental state metric comprises a cognitive load.

20. The system of claim 19, wherein the at least one cognitive mental state metric further comprises at least one of an anxiety level, a motivation level, a focus level, and an attention level.

21. The system of claim 17, wherein the adapting is triggered based on at least one threshold of the at least one cognitive mental state metric.

22. The system of claim 17, wherein a classifier is used to classify the real-time biometric data into the at least one cognitive state metric.

23. The system of claim 17, wherein the predictive engine comprises a machine learning model trained to proactively adapt the education materials to maintain the at least one cognitive mental state metric within a desired range to maintain learning efficiency.

24. The system of claim 17, wherein the adapting is selected to maintain the at least one cognitive mental state within a selected range of values.

25. The system of claim 17, wherein the predictive engine proactively adapts the educational materials to maintain the at least one cognitive mental state metric within a desired range and prevent the development of a cognitive mental state deleterious to learning.

26. The system of claim 17, wherein the adapting comprises at least one of adapting a complexity of the learning session, adapting a pace of the learning session, and incorporating rest periods in the learning session.

27. The system of claim 17, wherein the user computing device having a display comprises a wearable device.

28. The system of claim 27, wherein the user computing device having a display comprises a headset.

29. The system of claim 28, where the non-wearable device is a laptop computer or a tablet device.

30. The system of claim 27, wherein the wearable device is an augmented reality headset or a virtual reality headset.

31. The system of claim 17, wherein the user computing device having a display comprises a non-wearable device.

* * * * *